United States Patent
Xu et al.

(10) Patent No.: US 12,438,371 B2
(45) Date of Patent: Oct. 7, 2025

(54) POWER SUPPLY SYSTEM AND GRID CONNECTION CONTROL METHOD

(71) Applicant: Huawei Digital Power Technologies Co., Ltd., Shenzhen (CN)

(72) Inventors: Fei Xu, Shenzhen (CN); Xinyu Yu, Shanghai (CN); Kai Xin, Shanghai (CN); Shuchao Wang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 15 days.

(21) Appl. No.: 18/625,478

(22) Filed: Apr. 3, 2024

(65) Prior Publication Data

US 2024/0250534 A1     Jul. 25, 2024

Related U.S. Application Data

(63) Continuation of application No. PCT/CN2023/100649, filed on Jun. 16, 2023.

(30) Foreign Application Priority Data

Jul. 26, 2022  (CN) .......................... 202210887844.7

(51) Int. Cl.
*H02J 3/16*      (2006.01)
*H02J 3/46*      (2006.01)
*H02M 7/44*    (2006.01)

(52) U.S. Cl.
CPC ................. *H02J 3/16* (2013.01); *H02J 3/46* (2013.01); *H02M 7/44* (2013.01)

(58) Field of Classification Search
CPC ................. H02J 3/16; H02J 3/46; H02M 7/44
USPC ............................................................ 307/45
See application file for complete search history.

(56) References Cited

U.S. PATENT DOCUMENTS 11,784,493 B2 * 10/2023 Jiang ....................... H02J 3/381
                                                                                307/43
2010/0157634 A1    6/2010 Yu et al.
2016/0006338 A1    1/2016 Sakimoto et al.

FOREIGN PATENT DOCUMENTS

| CN | 110176790 A | 8/2019 |
|---|---|---|
| CN | 110783953 A | 2/2020 |
| CN | 112421694 A | 2/2021 |
| CN | 115313479 A | 11/2022 |
| WO | 2022044135 A1 | 3/2022 |

* cited by examiner

*Primary Examiner* — Hal Kaplan
(74) *Attorney, Agent, or Firm* — Maier & Maier, PLLC

(57) ABSTRACT

A power supply system and a grid connection control method. The power supply system includes a power supply, an inverter, a transformer, a power station collection module, and an inverter collection control circuit. The inverter collection control circuit is configured to obtain an amplitude value and a frequency of an output voltage of the inverter, obtain an inverter power adjustment signal based on the amplitude value and the frequency of the output voltage, and control, based on the power station power adjustment signal and the inverter power adjustment signal, the inverter to output a target output power. Additionally, an output power of the inverter may be adjusted by using the power station collection module and the inverter collection control circuit. A structure is simple, and a control method is simple. This improves control precision and adjustment efficiency, reduces control time, and reduces control costs.

20 Claims, 6 Drawing Sheets

POWER SUPPLY SYSTEM AND GRID CONNECTION CONTROL METHOD

CROSS-REFERENCE TO RELATED APPLICATIONS

This application is a continuation of International Application No. PCT/CN2023/100649, filed on Jun. 16, 2023, which claims priority to Chinese Patent Application No. 202210887844.7, filed on Jul. 26, 2022. The disclosures of the aforementioned applications are hereby incorporated by reference in their entireties.

TECHNICAL FIELD

The embodiments relate to the field of power electronics technologies and to a power supply system and a grid connection control method.

BACKGROUND

In the field of power electronics technologies, as various new energy power supply (for example, photovoltaic power generation) technologies become increasingly mature, more new energy power supply systems are put into use. As a core component of a new energy power supply system, an inverter can convert direct current electric energy generated by a new energy power station into alternating current electric energy and merge the alternating current electric energy into a power grid. During actual production application, because impedance of a load in a system usually changes (or because a power generation power of a power station of the new energy power supply system is unstable), a voltage and a frequency of a grid connection point at a connection point between the new energy power supply system and the power grid fluctuate, which increases a loss of an electric energy device or even endangers device safety. During research and practice, it has been found that, in the conventional technology, an inverter is generally equivalent to a current source, and control is performed based on a linear relationship between an output voltage (and an output frequency) and a reactive power (and an active power) of the inverter at a detection point. However, this control manner is complex, control costs are high, and an error of a linear control method is large. In addition, an output voltage and an output frequency of the detection point are different from those of the grid connection point, control errors are increased, and control effect is poor.

SUMMARY

The embodiments provide a power supply system and a grid connection control method to adjust an output power of an inverter by using a power station collection module and an inverter collection control circuit. The embodiments can provide for a relatively simple structure and control method. This improves control precision and adjustment efficiency, reduces control time, and reduces control costs.

According to a first aspect, the embodiments provide a power supply system. The power supply system includes a power supply, an inverter, a transformer, a power station collection module, and an inverter collection control circuit. Herein, the power supply may be connected to the transformer through the inverter, the transformer may be connected to a power grid at a grid connection point, one end of the power station collection module may be connected to the grid connection point, the other end of the power station collection module may be connected to a first end of the inverter collection control circuit, a second end of the inverter collection control circuit may be connected between the inverter and the transformer, and a third end of the inverter collection control circuit may be connected to the inverter. The power station collection module herein may be configured to obtain an amplitude value and a frequency of a grid connection voltage at the grid connection point, and obtain a power station power adjustment signal based on the amplitude value and the frequency of the grid connection voltage. The inverter collection control circuit herein may be configured to obtain an amplitude value and a frequency of an output voltage of the inverter, obtain an inverter power adjustment signal based on the amplitude value and the frequency of the output voltage, and control, based on the power station power adjustment signal and the inverter power adjustment signal, the inverter to output a target output power.

In implementations provided in the embodiments, the power station collection module may obtain the amplitude value and the frequency of the grid connection voltage at the grid connection point. Herein, the amplitude value and the frequency of the grid connection voltage are related to a power station power (that is, an output power of the power supply system at the grid connection point). The system may determine an adjustment amount of the power station power based on the amplitude value and the frequency of the grid connection voltage, to further obtain the power station power adjustment signal. The inverter collection control circuit may obtain the amplitude value and the frequency of the output voltage of the inverter. Herein, the amplitude value and the frequency of the output voltage of the inverter are related to an inverter power (that is, an output power of the inverter). The inverter collection control circuit may determine an adjustment amount of the inverter power based on the amplitude value and the frequency of the output voltage of the inverter, to further obtain the inverter power adjustment signal. Because another functional module or an electric energy element (for example, the transformer) exists between an output end of the inverter and the grid connection point, the inverter collection control circuit may obtain a target adjustment amount of the output power of the inverter jointly based on the power station power adjustment signal and the inverter power adjustment signal, and may control the inverter to output the target output power.

According to the implementations provided in the embodiments, the system may collect the amplitude value and the frequency of the grid connection voltage at the grid connection point and the amplitude value and the frequency of the output voltage of the inverter by using the power station collection module and the inverter collection control circuit, and separately determine the power station power adjustment signal and the inverter power adjustment signal, to further adjust the output power of the inverter based on the power station power adjustment signal and the inverter power adjustment signal. A structure is simple, and a control method is simple. This improves control precision and adjustment efficiency, reduces control time, and reduces control costs.

With reference to the first aspect, in a first possible implementation, the inverter collection control circuit may include an inverter collection module and a power adjustment module. Herein, a first end of the power adjustment module may be used as the first end of the inverter collection control circuit and is connected to the power station collection module, one end of the inverter collection module may be used as the second end of the inverter collection control circuit and is connected between the inverter and the transformer, the other end of the inverter collection module may be connected to a second end of the power adjustment module, and a third end of the power adjustment module may be used as the third end of the inverter collection control circuit and is connected to the inverter. The inverter collection module herein may be configured to obtain the amplitude value and the frequency of the output voltage of the inverter, obtain an inverter reactive power adjustment amount based on the amplitude value of the output voltage, obtain an inverter active power adjustment amount based on the frequency of the output voltage, and obtain the inverter power adjustment signal based on the inverter reactive power adjustment amount and the inverter active power adjustment amount. The power adjustment module herein may be configured to generate an output power adjustment signal based on the power station power adjustment signal and the inverter power adjustment signal, and control, by using the output power adjustment signal, the inverter to output the target output power. It may be understood that, after the inverter collection module obtains the amplitude value and the frequency of the output voltage of the inverter, because the amplitude value of the output voltage of the inverter is nonlinearly related to a reactive power adjustment amount of the inverter power (that is, the output power of the inverter), and the frequency of the output voltage of the inverter is nonlinearly related to an active power adjustment amount of the inverter power (that is, the output power of the inverter), the inverter collection module may determine the reactive power adjustment amount and the active power adjustment amount of the inverter power respectively based on the amplitude value and the frequency of the output voltage of the inverter, to further obtain the inverter power adjustment signal. It may be further understood that, the power adjustment module may obtain the target adjustment amount of the output power of the inverter jointly based on the power station power adjustment signal output by the power station collection module and the inverter power adjustment signal output by the inverter collection control circuit, and may control the inverter to output the target output power.

According to the implementations provided in the embodiments, the inverter collection module may determine the reactive power adjustment amount and the active power adjustment amount of the inverter power respectively based on the amplitude value and the frequency of the output voltage of the inverter, to further obtain the inverter power adjustment signal. The power adjustment module may obtain the target adjustment amount of the output power of the inverter jointly based on the power station power adjustment signal output by the power station collection module and the inverter power adjustment signal output by the inverter collection control circuit, and may control the inverter to output the target output power. A structure is simple. In addition, the system may separately control a reactive power and an active power of the inverter. This improves control precision and adjustment efficiency, reduces control time, and reduces control costs.

With reference to the first possible implementation of the first aspect, in a second possible implementation, the power station power adjustment signal may include a power station reactive power adjustment amount and a power station active power adjustment amount. The power station collection module herein may be further configured to obtain the power station reactive power adjustment amount based on the amplitude value of the grid connection voltage, obtain the power station active power adjustment amount based on the frequency of the grid connection voltage, and output the power station reactive power adjustment amount and the power station active power adjustment amount to the inverter collection control circuit. It may be understood that, after the power station collection module obtains the amplitude value and the frequency of the grid connection voltage, because the amplitude value of the grid connection voltage is nonlinearly related to a reactive power adjustment amount in the power station power (that is, the output power of the power supply system at the grid connection point), and the frequency of the grid connection voltage is nonlinearly related to an active power adjustment amount in the power station power (that is, the output power of the power supply system at the grid connection point), the power station collection module may determine the reactive power adjustment amount and the active power adjustment amount of the power station power respectively based on the amplitude value and the frequency of the grid connection voltage at the grid connection point, to further output the power station reactive power adjustment amount and the power station active power adjustment amount to the inverter collection control circuit. According to the implementations provided in the embodiments, the power station collection module may determine the reactive power adjustment amount and the active power adjustment amount of the power station power respectively based on the amplitude value and the frequency of the grid connection voltage of the grid connection point, to further output the reactive power adjustment amount and the active power adjustment amount of the power station power as the power station power adjustment signal to the power adjustment module in the inverter collection control circuit. Therefore, the power adjustment module may obtain a target reactive power adjustment amount of the output power of the inverter based on the power station reactive power adjustment amount and the inverter reactive power adjustment amount, and may also obtain a target active power adjustment amount of the output power of the inverter based on the power station active power adjustment amount and the inverter active power adjustment amount, and may control the inverter to output the target output power (herein, the target output power may include a target reactive power and a target active power). A structure is simple. In addition, the system may control the inverter to separately output the target reactive power and/or the target active power. This improves control precision and adjustment efficiency, reduces control time, and reduces control costs.

With reference to the first possible implementation of the first aspect, in a third possible implementation, the power station power adjustment signal may include the amplitude value and the frequency of the grid connection voltage. The power station collection module herein may be further configured to obtain the amplitude value and the frequency of the grid connection voltage at the grid connection point, and output the amplitude value and the frequency of the grid connection voltage at the grid connection point to the inverter collection control circuit. Herein, in a scenario in which a communication speed (or a frequency) of the power station collection module and the inverter collection control circuit is limited, or in another scenario in which real-time communication between the power station collection module and the inverter collection control circuit is inconvenient, the power station collection module may obtain the amplitude value and the frequency of the grid connection voltage at the grid connection point, and output the amplitude value and the frequency of the grid connection voltage at the grid connection point to the inverter collection control circuit. The inverter collection control circuit determines the adjustment amount of the power station power based on the amplitude value and the frequency of the grid connection voltage. According to the implementations provided in the embodiments, in the scenario in which the communication speed (or the frequency) between the power station collection module and the inverter collection control circuit is limited, or in another scenario in which the real-time communication between the power station collection module and the inverter collection control circuit is inconvenient, the system may output the amplitude value and the frequency of the grid connection voltage at the grid connection point to the inverter collection control circuit by using the inverter collection control circuit, and the inverter collection control circuit determines the adjustment amount of the power station based on the amplitude value and the frequency of the grid connection voltage. A method is simple and flexible, has high applicability, and enriches application scenarios and an application scope of the system.

With reference to the third possible implementation of the first aspect, in a fourth possible implementation, the inverter collection control circuit may further include a signal determining module. Herein, the first end of the power adjustment module may be connected to the power station collection module through the signal determining module. The signal determining module herein may be configured to obtain a power station reactive power adjustment amount based on the amplitude value of the grid connection voltage, obtain a power station active power adjustment amount based on the frequency of the grid connection voltage, and output the power station reactive power adjustment amount and the power station active power adjustment amount to the power adjustment module. Herein, in the scenario in which the communication speed (or the frequency) between the power station collection module and the inverter collection control circuit is limited, or in another scenario in which the real-time communication between the power station collection module and the inverter collection control circuit is inconvenient, or in another scenario in which the power station collection module directly transmits the amplitude value and the frequency of the grid connection voltage to the inverter collection control circuit, the signal determining module may determine a reactive power adjustment amount and an active power adjustment amount of the power station power respectively based on the amplitude value and the frequency of the grid connection voltage of the grid connection point, to further output the reactive power adjustment amount and the active power adjustment amount of the power station power as the power station power adjustment signal to the power adjustment module in the inverter collection control circuit. Therefore, the power adjustment module may obtain a target reactive power adjustment amount of the output power of the inverter jointly based on the power station reactive power adjustment amount and the inverter reactive power adjustment amount, and may also obtain a target active power adjustment amount of the output power of the inverter jointly based on the power station useful power adjustment amount and the inverter active power adjustment amount, and may control the inverter to output the target output power (herein, the target output power may include a target reactive power and a target active power). A structure is simple. In addition, the inverter may be controlled to separately output the target reactive power and/or the target active power. This improves control precision and adjustment efficiency, reduces control time, and reduces control costs.

According to the implementations provided in the embodiments, in the scenario in which the communication speed (or the frequency) between the power station collection module and the inverter collection control circuit is limited, or in another scenario in which the real-time communication between the power station collection module and the inverter collection control circuit is inconvenient, or in another scenario in which the power station collection module directly transmits the amplitude value and the frequency of the grid connection voltage to the inverter collection control circuit, the signal determining module may determine the reactive power adjustment amount and the active power adjustment amount of the power station power respectively based on the amplitude value and the frequency of the grid connection voltage of the grid connection point, to further output the reactive power adjustment amount and the active power adjustment amount of the power station power as the power station power adjustment signal to the power adjustment module in the inverter collection control circuit. A method is simple and flexible, has high applicability, and enriches the application scenarios and the application scope of the system. The power adjustment module may obtain the target reactive power adjustment amount of the output power of the inverter jointly based on the power station reactive power adjustment amount and the inverter reactive power adjustment amount, and may also obtain the target active power adjustment amount of the output power of the inverter jointly based on the power station useful power adjustment amount and the inverter active power adjustment amount, and may control the inverter to output the target output power (herein, the target output power may include the target reactive power and the target active power). A structure is simple. In addition, the system may control the inverter to separately output the target reactive power and/or the target active power. This improves control precision and adjustment efficiency, reduces control time, and reduces control costs.

With reference to the second possible implementation or the fourth possible implementation of the first aspect, in a fifth possible implementation, the power adjustment module may further include an adjustment amount determining unit and a power control unit. Herein, the power control unit is connected to the inverter and one end of the adjustment amount determining unit, and the other end of the adjustment amount determining unit is connected to the inverter collection module, or the other end of the adjustment amount determining unit is connected to the signal determining module. The adjustment amount determining unit herein may be configured to obtain an output reactive power adjustment amount based on the power station reactive power adjustment amount and the inverter reactive power adjustment amount, obtain an output active power adjustment amount based on the power station active power adjustment amount and the inverter active power adjustment amount, and generate the output power adjustment signal based on the output reactive power adjustment amount and the output active power adjustment amount. The power control unit herein may be configured to control, by using the output power adjustment signal, the inverter to output the target output power. Herein, the adjustment amount determining unit (for example, a proportional integral amplification circuit) may obtain the output reactive power adjustment amount (that is, the target reactive power adjustment amount of the output power of the inverter) based on the power station reactive power adjustment amount and the inverter reactive power adjustment amount, and may also obtain the output active power adjustment amount (that is, the target active power adjustment amount of the output power of the inverter) based on the power station useful power adjustment amount and the inverter active power adjustment amount, and generate the output power adjustment signal (for example, a pulse width modulation signal or another control signal that may control the output power of the inverter) based on the output reactive power adjustment amount and the output active power adjustment amount. Herein, the power control unit may control, by using the output power adjustment signal, the inverter to output the target output power (herein, the target output power may include the target reactive power and the target active power). This improves control precision and adjustment efficiency, reduces control time, and reduces control costs.

With reference to the fifth possible implementation of the first aspect, in a sixth possible implementation, the inverter reactive power adjustment amount and the inverter active power adjustment amount satisfy:

$$d^2Q1(u)/du^2 < 0$$

$$d^2P1(f)/df^2 < 0$$

Herein, $Q1(u)$ is a function of the inverter reactive power adjustment amount about the amplitude value of the output voltage, $d^2Q1(u)/du^2$ is a second derivative of the inverter reactive power adjustment amount about the amplitude value of the output voltage, $P1(f)$ is a function of the inverter active power adjustment amount about the frequency of the output voltage, and $d^2P1(f)/df^2$ is a second derivative of the inverter active power adjustment amount about the frequency of the output voltage.

It may be understood that, in an application scenario, a larger difference between the amplitude value of the output voltage and an amplitude value of a target output voltage indicates a larger corresponding inverter reactive power adjustment amount. The inverter reactive power adjustment amount is not simply linearly related to the amplitude value of the output voltage. When a difference between the amplitude value of the output voltage and the amplitude value of the target output voltage increases, a growth rate of the corresponding inverter reactive power adjustment amount is greater than a growth rate of the difference between the amplitude value of the output voltage and the amplitude value of the target output voltage. Therefore, $Q1(u)$ (for example, a quadratic power function) is used as a fitting function of the inverter reactive power adjustment amount about the amplitude value of the output voltage, so that the inverter reactive power adjustment amount may be prevented from being excessively small in linear fitting when the difference between the amplitude value of the output voltage and the amplitude value of the target output voltage is large due to an excessively small linear fitting coefficient, and the inverter reactive power adjustment amount may also be prevented from being excessively large in linear fitting when the difference between the amplitude value of the output voltage and the amplitude value of the target output voltage is small due to an excessively large linear fitting coefficient.

It may be further understood that, in an application scenario, a larger difference between the frequency of the output voltage and a frequency of the target output voltage indicates a larger corresponding inverter active power adjustment amount. The inverter active power adjustment amount is not simply linearly related to the frequency of the output voltage. When a difference between the frequency of the output voltage and the frequency of the target output voltage increases, a growth rate of the corresponding inverter active power adjustment amount is greater than a growth rate of the difference between the frequency of the output voltage and the frequency of the target output voltage. Therefore, $P1(f)$ (for example, a quadratic power function) is used as the function of the inverter active power adjustment amount about the frequency of the output voltage, so that the inverter active power adjustment amount may be prevented from being excessively small in linear fitting when the difference between the frequency of the output voltage and the frequency of the target output voltage is large due to an excessively small linear fitting coefficient, and the inverter active power adjustment amount may also be prevented from being excessively large in linear fitting when the difference between the frequency of the output voltage and the frequency of the target output voltage is small due to an excessively large linear fitting coefficient.

According to the implementations provided in the embodiments, $Q1(u)$ (for example, a quadratic power function) is used as the function of the inverter reactive power adjustment amount about the amplitude value of the output voltage, so that the inverter reactive power adjustment amount may be obtained more accurately based on the amplitude value of the output voltage. A method is simple, and control precision and control efficiency are improved. $P1(f)$ (for example, a quadratic power function) is used as the function of the inverter active power adjustment amount about the frequency of the output voltage, so that the inverter active power adjustment amount may be obtained more accurately based on the frequency of the output voltage. A method is simple, and control precision and control efficiency are improved.

With reference to the sixth possible implementation of the first aspect, in a seventh possible implementation, the power station reactive power adjustment amount and the inverter active power adjustment amount satisfy:

$$d^2Q2(u)/du^2 < 0$$

$$d^2P2(f)/df^2 < 0$$

Herein, $Q2(u)$ is a function of the power station reactive power adjustment amount about the amplitude value of the grid connection voltage, $d^2Q2(u)/du^2$ is a second derivative of the power station reactive power adjustment amount about the amplitude value of the grid connection voltage, $P2(f)$ is a function of the power station active power adjustment amount about the frequency of the grid connection voltage, and $d^2P2(f)/df^2$ is a second derivative of the power station active power adjustment amount about the frequency of the grid connection voltage.

It may be understood that, in an application scenario, a larger difference between the amplitude value of the grid connection voltage and an amplitude value of a target grid connection voltage indicates a larger corresponding power station reactive power adjustment amount. The power station reactive power adjustment amount is not simply linearly related to the amplitude value of the grid connection voltage. When the difference between the amplitude value of the grid connection voltage and the amplitude value of the target grid connection voltage increases, a growth rate of the corresponding power station reactive power adjustment amount is greater than a growth rate of the difference between the amplitude value of the grid connection voltage and the amplitude value of the target grid connection voltage. Therefore, Q2(u) (for example, a quadratic power function) is used as a fitting function of the power station reactive power adjustment amount about the amplitude value of the grid connection voltage, so that the power station reactive power adjustment amount may be prevented from being excessively small in linear fitting when the difference between the amplitude value of the grid connection voltage and the amplitude value of the target grid connection voltage is large due to an excessively small linear fitting coefficient, and the power station reactive power adjustment amount may also be prevented from being excessively large in linear fitting when the difference between the amplitude value of the grid connection voltage and the amplitude value of the target grid connection voltage is small due to an excessively large linear fitting coefficient.

It may be further understood that, in an application scenario, a larger difference between the frequency of the grid connection voltage and a frequency of the target grid connection voltage indicates a larger corresponding power station active power adjustment amount. The power station active power adjustment amount is not simply linearly related to the frequency of the grid connection voltage. When a difference between the frequency of the grid connection voltage and the frequency of the target grid connection voltage increases, a growth rate of the corresponding power station active power adjustment amount is greater than a growth rate of the difference between the frequency of the grid connection voltage and the frequency of the target grid connection voltage. Therefore, P2(f) (for example, a quadratic power function) is used as the function of the power station active power adjustment amount about the frequency of the grid connection voltage, so that the power station active power adjustment amount may be prevented from being excessively small in linear fitting when the difference between the frequency of the grid connection voltage and the frequency of the target grid connection voltage is large due to an excessively small linear fitting coefficient, and the power station active power adjustment amount may also be prevented from being excessively large in linear fitting when the difference between the frequency of the grid connection voltage and the frequency of the target grid connection voltage is small due to an excessively large linear fitting coefficient.

According to the implementations provided in the embodiments, Q2(u) (for example, a quadratic power function) is used as the function of the power station reactive power adjustment amount about the amplitude value of the grid connection voltage, so that the power station reactive power adjustment amount may be obtained more accurately based on the amplitude value of the grid connection voltage. A method is simple, and control precision and control efficiency are improved. P2(f) (for example, a quadratic power function) is used as the function of the power station active power adjustment amount about the frequency of the grid connection voltage, so that the power station active power adjustment amount may be obtained more accurately based on the frequency of the grid connection voltage. A method is simple, and control precision and control efficiency are improved.

With reference to the seventh possible implementation of the first aspect, in an eighth possible implementation, the output reactive power adjustment amount and the output active power adjustment amount satisfy:

$$Qout = Q1 + k1(Q2 - Q1)$$
$$Pout = P1 + k2(P2 - P1)$$

Herein, Qout is the output reactive power adjustment amount, Q1 is the inverter reactive power adjustment amount, Q2 is the power station reactive power adjustment amount, k1 is an output reactive power adjustment coefficient, Pout is the output active power adjustment amount, P1 is the inverter active power adjustment amount, P2 is the power station active power adjustment amount, and k2 is an output active power adjustment coefficient.

According to the implementations provided in the embodiments, the system may obtain the output reactive power adjustment amount Qout (that is, the target reactive power adjustment amount of the output power of the inverter) based on the power station reactive power adjustment amount Q1 and the inverter reactive power adjustment amount Q1, and may also obtain the output active power adjustment amount Pout (that is, the target active power adjustment amount of the output power of the inverter) based on the power station active power adjustment amount P2 and the inverter active power adjustment amount P1, and generate the output power adjustment signal (for example, a pulse width modulation signal or another control signal that may control the output power of the inverter) based on the output reactive power adjustment amount Qout and the output active power adjustment amount Pout. This improves control precision and adjustment efficiency, reduces control time, and reduces control costs.

With reference to the eighth possible implementation of the first aspect, in a ninth possible implementation, the power supply system may further include a combiner box, and the power supply may be connected to the inverter through the combiner box.

With reference to the ninth possible implementation of the first aspect, in a tenth possible implementation, the power supply system may further include a direct current bus, the power supply may be connected to the direct current bus through the combiner box, and the direct current bus is connected to the inverter.

With reference to the tenth possible implementation of the first aspect, in an eleventh possible implementation, the power supply system may further include an on-grid and off-grid wiring apparatus, and the transformer may be connected to the power grid through the on-grid and off-grid wiring apparatus.

In the embodiments, functional modules in the power supply system have diversified and flexible composition manners, and can adapt to different power supply environments. This improves diversity of application scenarios of the power supply system and enhances adaptability of the power supply system.

According to a second aspect, the embodiments provide a grid connection control method. The grid connection control method is applicable to a power station collection module that is connected to a grid connection point and that is in a power supply system, and applicable to an inverter collection control circuit of the power supply system, and is also applicable to the power supply system according to any one of the first aspect or the possible implementations of the first aspect. The method includes: the power station collection module obtains an amplitude value and a frequency of a grid connection voltage at the grid connection point, and obtains a power station power adjustment signal based on the amplitude value and the frequency of the grid connection voltage; and the inverter collection control circuit obtains an amplitude value and a frequency of an output voltage of an inverter, obtains an inverter power adjustment signal based on the amplitude value and the frequency of the output voltage, and controls, based on the power station power adjustment signal and the inverter power adjustment signal, the inverter to output a target output power.

In the implementations provided in the embodiments, the power station collection module may obtain the amplitude value and the frequency of the grid connection voltage at the grid connection point. Herein, the amplitude value and the frequency of the grid connection voltage are related to a power station power (that is, an output power of the power supply system at the grid connection point). The system may determine an adjustment amount of the power station power based on the amplitude value and the frequency of the grid connection voltage, to further obtain the power station power adjustment signal. The inverter collection control circuit may obtain the amplitude value and the frequency of the output voltage of the inverter. Herein, the amplitude value and the frequency of the output voltage of the inverter are related to an inverter power (that is, an output power of the inverter). The inverter collection control circuit may determine an adjustment amount of the inverter power based on the amplitude value and the frequency of the output voltage of the inverter, to further obtain the inverter power adjustment signal. Because another functional module or an electric energy element (for example, the transformer) exists between an output end of the inverter and the grid connection point, the inverter collection control circuit may obtain a target adjustment amount of the output power of the inverter jointly based on the power station power adjustment signal and the inverter power adjustment signal, and may control the inverter to output the target output power.

According to the implementations provided in the embodiments, the system may collect the amplitude value and the frequency of the grid connection voltage at the grid connection point and the amplitude value and the frequency of the output voltage of the inverter by using the power station collection module and the inverter collection control circuit, and separately determine the power station power adjustment signal and the inverter power adjustment signal, to further adjust the output power of the inverter based on the power station power adjustment signal and the inverter power adjustment signal. A structure is simple, and a control method is simple. This improves control precision and adjustment efficiency, reduces control time, and reduces control costs.

With reference to the second aspect, in a first possible implementation, that the inverter collection control circuit obtains an amplitude value and a frequency of an output voltage of an inverter, obtains an inverter power adjustment signal based on the amplitude value and the frequency of the output voltage, and controls, based on the power station power adjustment signal and the inverter power adjustment signal, the inverter to output a target output power may include: obtaining the amplitude value and the frequency of the output voltage of the inverter, obtaining an inverter reactive power adjustment amount based on the amplitude value of the output voltage, obtaining an inverter active power adjustment amount based on the frequency of the output voltage, and obtaining the inverter power adjustment signal based on the inverter reactive power adjustment amount and the inverter active power adjustment amount; and generating an output power adjustment signal based on the power station power adjustment signal and the inverter power adjustment signal, and controlling, by using the output power adjustment signal, the output power of the inverter to be the target output power. It may be understood that, after the obtaining the amplitude value and the frequency of the output voltage of the inverter, because the amplitude value of the output voltage of the inverter is nonlinearly related to a reactive power adjustment amount of the inverter power (that is, the output power of the inverter), and the frequency of the output voltage of the inverter is nonlinearly related to an active power adjustment amount of the inverter power (that is, the output power of the inverter), the inverter collection control circuit may determine the reactive power adjustment amount and the active power adjustment amount of the inverter power respectively based on the amplitude value and the frequency of the output voltage of the inverter, to further obtain the inverter power adjustment signal. It may be further understood that, the inverter collection control circuit may obtain the target adjustment amount of the output power of the inverter jointly based on the power station power adjustment signal output by the power station collection module and the inverter power adjustment signal output by the inverter collection control circuit, and may control the inverter to output the target output power.

According to the implementations provided in the embodiments, the inverter collection control circuit may determine the reactive power adjustment amount and the active power adjustment amount of the inverter power respectively based on the amplitude value and the frequency of the output voltage of the inverter, to obtain the inverter power adjustment signal, to further obtain the target adjustment amount of the output power of the inverter jointly based on the power station power adjustment signal output by the power station collection module and the inverter power adjustment signal output by the inverter collection control circuit, and may control the inverter to output the target output power. A structure is simple. In addition, the inverter collection control circuit may separately control a reactive power and an active power of the inverter. This improves control precision and adjustment efficiency, reduces control time, and reduces control costs.

With reference to the first possible implementation of the second aspect, in a second possible implementation, the power station power adjustment signal may include a power station reactive power adjustment amount and a power station active power adjustment amount, and the obtaining a power station power adjustment signal based on the amplitude value and the frequency of the grid connection voltage may include: the power station collection module obtains the power station reactive power adjustment amount based on the amplitude value of the grid connection voltage, obtains the power station active power adjustment amount based on the frequency of the grid connection voltage, and outputs the power station reactive power adjustment amount and the power station active power adjustment amount to the inverter collection control circuit. It may be understood that, after the power station collection module obtains the amplitude value and the frequency of the grid connection voltage, because the amplitude value of the grid connection voltage is nonlinearly related to a reactive power adjustment amount in the power station power (that is, the output power of the power supply system at the grid connection point), and the frequency of the grid connection voltage is nonlinearly related to an active power adjustment amount in the power station power (that is, the output power of the power supply system at the grid connection point), the power station collection module may determine the reactive power adjustment amount and the active power adjustment amount of the power station power respectively based on the amplitude value and the frequency of the grid connection voltage at the grid connection point, to further output the power station reactive power adjustment amount and the power station active power adjustment amount to the inverter collection control circuit. According to the implementations provided in the embodiments, the power station collection module may determine the reactive power adjustment amount and the active power adjustment amount of the power station power respectively based on the amplitude value and the frequency of the grid connection voltage of the grid connection point, to further output the reactive power adjustment amount and the active power adjustment amount of the power station power as the power station power adjustment signal to a power adjustment module in the inverter collection control circuit. Therefore, the power adjustment module may obtain a target reactive power adjustment amount of the output power of the inverter based on the power station reactive power adjustment amount and the inverter reactive power adjustment amount, and may also obtain a target active power adjustment amount of the output power of the inverter based on the power station active power adjustment amount and the inverter active power adjustment amount, and may control the inverter to output the target output power (herein, the target output power may include a target reactive power and a target active power). A structure is simple. In addition, the system may control the inverter to separately output the target reactive power and/or the target active power. This improves control precision and adjustment efficiency, reduces control time, and reduces control costs.

With reference to the first possible implementation of the second aspect, in a third possible implementation, the power station power adjustment signal may include the amplitude value and the frequency of the grid connection voltage. The obtaining a power station power adjustment signal based on the amplitude value and the frequency of the grid connection voltage may include: The power station collection module obtains the amplitude value and the frequency of the grid connection voltage at the grid connection point, and outputs the amplitude value and the frequency of the grid connection voltage at the grid connection point to the inverter collection control circuit.

According to the implementations provided in the embodiments, in a scenario in which a communication speed (or a frequency) between the power station collection module and the inverter collection control circuit is limited, or in another scenario in which real-time communication between the power station collection module and the inverter collection control circuit is inconvenient, the system may output the amplitude value and the frequency of the grid connection voltage at the grid connection point to the inverter collection control circuit by using the inverter collection control circuit, and the inverter collection control circuit determines the adjustment amount of the power station based on the amplitude value and the frequency of the grid connection voltage. A method is simple and flexible, has high applicability, and enriches application scenarios and an application scope of the system.

With reference to the third possible implementation of the second aspect, in a fourth possible implementation, after the outputting the amplitude value and the frequency of the grid connection voltage at the grid connection point to the inverter collection control circuit, the method may include: obtaining a power station reactive power adjustment amount based on the amplitude value of the grid connection voltage, obtaining a power station active power adjustment amount based on the frequency of the grid connection voltage, and outputting the power station reactive power adjustment amount and the power station active power adjustment amount. Herein, in the scenario in which the communication speed (or the frequency) between the power station collection module and the inverter collection control circuit is limited, or in another scenario in which the real-time communication between the power station collection module and the inverter collection control circuit is inconvenient, or in another scenario in which the power station collection module directly transmits the amplitude value and the frequency of the grid connection voltage to the inverter collection control circuit, the inverter collection control circuit may determine a reactive power adjustment amount and an active power adjustment amount of the power station power respectively based on the amplitude value and the frequency of the grid connection voltage of the grid connection point, to further output the reactive power adjustment amount and the active power adjustment amount of the power station power as the power station power adjustment signal. Therefore, the inverter collection control circuit may obtain a target reactive power adjustment amount of the output power of the inverter jointly based on the power station reactive power adjustment amount and the inverter reactive power adjustment amount, and may also obtain a target active power adjustment amount of the output power of the inverter jointly based on the power station active power adjustment amount and the inverter active power adjustment amount, and may control the inverter to output the target output power (herein, the target output power may include a target reactive power and a target active power). A structure is simple. In addition, the inverter collection control circuit may control the inverter to separately output the target reactive power and/or the target active power. This improves control precision and adjustment efficiency, reduces control time, and reduces control costs.

According to the implementations provided in the embodiments, in the scenario in which the communication speed (or the frequency) between the power station collection module and the inverter collection control circuit is limited, or in another scenario in which the real-time communication between the power station collection module and the inverter collection control circuit is inconvenient, or in another scenario in which the power station collection module directly transmits the amplitude value and the frequency of the grid connection voltage to the inverter collection control circuit, the inverter collection control circuit may determine the reactive power adjustment amount and the active power adjustment amount of the power station power respectively based on the amplitude value and the frequency of the grid connection voltage of the grid connection point, to further output the reactive power adjustment amount and the active power adjustment amount of the power station power as the power station power adjustment signal. A method is simple and flexible, has high applicability, and enriches the application scenarios and the application scope of the system. The inverter collection control circuit may obtain the target reactive power adjustment amount of the output power of the inverter jointly based on the power station reactive power adjustment amount and the inverter reactive power adjustment amount, and may also obtain the target active power adjustment amount of the output power of the inverter jointly based on the power station active power adjustment amount and the inverter active power adjustment amount, and may control the inverter to output the target output power (herein, the target output power may include the target reactive power and the target active power). A structure is simple. In addition, the inverter collection control circuit may control the inverter to separately output the target reactive power and/or the target active power. This improves control precision and adjustment efficiency, reduces control time, and reduces control costs.

With reference to the second possible implementation or the fourth possible implementation of the second aspect, in a fifth possible implementation, the generating an output power adjustment signal based on the power station power adjustment signal and the inverter power adjustment signal, and controlling, by using the output power adjustment signal, the output power of the inverter to be the target output power may include: obtaining an output reactive power adjustment amount based on the power station reactive power adjustment amount and the inverter reactive power adjustment amount, obtaining an output active power adjustment amount based on the power station active power adjustment amount and the inverter active power adjustment amount, and generating the output power adjustment signal based on the output reactive power adjustment amount and the output active power adjustment amount. The inverter is controlled, by using the output power adjustment signal, to output the target output power. Herein, the inverter collection control circuit may obtain the output reactive power adjustment amount (that is, the target reactive power adjustment amount of the output power of the inverter) based on the power station reactive power adjustment amount and the inverter reactive power adjustment amount, and may also obtain the output active power adjustment amount (that is, the target active power adjustment amount of the output power of the inverter) based on the power station active power adjustment amount and the inverter active power adjustment amount, and generate the output power adjustment signal (for example, a pulse width modulation signal or another control signal that may control the output power of the inverter) based on the output reactive power adjustment amount and the output active power adjustment amount. Herein, the inverter collection control circuit may further control, by using the output power adjustment signal, the inverter to output the target output power (herein, the target output power may include the target reactive power and the target active power). This improves control precision and adjustment efficiency, reduces control time, and reduces control costs.

With reference to the fifth possible implementation of the second aspect, in a sixth possible implementation, the inverter reactive power adjustment amount and the inverter active power adjustment amount satisfy:

$$d^2Q1(u)/du^2 < 0$$
$$d^2P1(f)/df^2 < 0$$

Herein, Q1(u) is a function of the inverter reactive power adjustment amount about the amplitude value of the output voltage, $d^2Q1(u)/du^2$ is a second derivative of the inverter reactive power adjustment amount about the amplitude value of the output voltage, P1(f) is a function of the inverter active power adjustment amount about the frequency of the output voltage, and $d^2P1(f)/df^2$ is a second derivative of the inverter active power adjustment amount about the frequency of the output voltage.

It may be understood that, in an application scenario, a larger difference between the amplitude value of the output voltage and an amplitude value of a target output voltage indicates a larger corresponding inverter reactive power adjustment amount. The inverter reactive power adjustment amount is not simply linearly related to the amplitude value of the output voltage. When a difference between the amplitude value of the output voltage and the amplitude value of the target output voltage increases, a growth rate of the corresponding inverter reactive power adjustment amount is greater than a growth rate of the difference between the amplitude value of the output voltage and the amplitude value of the target output voltage. Therefore, Q1(u) (for example, a quadratic power function) is used as a fitting function of the inverter reactive power adjustment amount about the amplitude value of the output voltage, so that the inverter reactive power adjustment amount may be prevented from being excessively small in linear fitting when the difference between the amplitude value of the output voltage and the amplitude value of the target output voltage is large due to an excessively small linear fitting coefficient, and the inverter reactive power adjustment amount may also be prevented from being excessively large in linear fitting when the difference between the amplitude value of the output voltage and the amplitude value of the target output voltage is small due to an excessively large linear fitting coefficient.

It may be further understood that, in an application scenario, a larger difference between the frequency of the output voltage and a frequency of the target output voltage indicates a larger corresponding inverter active power adjustment amount. The inverter active power adjustment amount is not simply linearly related to the frequency of the output voltage. When a difference between the frequency of the output voltage and the frequency of the target output voltage increases, a growth rate of the corresponding inverter active power adjustment amount is greater than a growth rate of the difference between the frequency of the output voltage and the frequency of the target output voltage. Therefore, P1(f) (for example, a quadratic power function) is used as the function of the inverter active power adjustment amount about the frequency of the output voltage, so that the inverter active power adjustment amount may be prevented from being excessively small in linear fitting when the difference between the frequency of the output voltage and the frequency of the target output voltage is large due to an excessively small linear fitting coefficient, and the inverter active power adjustment amount may also be prevented from being excessively large in linear fitting when the difference between the frequency of the output voltage and the frequency of the target output voltage is small due to an excessively large linear fitting coefficient.

According to the implementations provided in the embodiments, Q1(u) (for example, a quadratic power function) is used as the function of the inverter reactive power adjustment amount about the amplitude value of the output voltage, so that the inverter reactive power adjustment amount may be obtained more accurately based on the amplitude value of the output voltage. A method is simple, and control precision and control efficiency are improved. P1(f) (for example, a quadratic power function) is used as the function of the inverter active power adjustment amount about the frequency of the output voltage, so that the inverter active power adjustment amount may be obtained more accurately based on the frequency of the output voltage. A method is simple, and control precision and control efficiency are improved.

With reference to the sixth possible implementation of the second aspect, in a seventh possible implementation, the power station reactive power adjustment amount and the inverter active power adjustment amount satisfy:

$$d^2Q2(u)/du^2 < 0$$

$$d^2P2(f)/df^2 < 0$$

Herein, Q2(u) is a function of the power station reactive power adjustment amount about the amplitude value of the grid connection voltage, $d^2Q2(u)/du^2$ is a second derivative of the power station reactive power adjustment amount about the amplitude value of the grid connection voltage, P2(f) is a function of the power station active power adjustment amount about the frequency of the grid connection voltage, and $d^2P2(f)/df^2$ is a second derivative of the power station active power adjustment amount about the frequency of the grid connection voltage.

It may be understood that, in an application scenario, a larger difference between the amplitude value of the grid connection voltage and an amplitude value of a target grid connection voltage indicates a larger corresponding power station reactive power adjustment amount. The power station reactive power adjustment amount is not simply linearly related to the amplitude value of the grid connection voltage. When the difference between the amplitude value of the grid connection voltage and the amplitude value of the target grid connection voltage increases, a growth rate of the corresponding power station reactive power adjustment amount is greater than a growth rate of the difference between the amplitude value of the grid connection voltage and the amplitude value of the target grid connection voltage. Therefore, Q2(u) (for example, a quadratic power function) is used as a fitting function of the power station reactive power adjustment amount about the amplitude value of the grid connection voltage, so that the power station reactive power adjustment amount may be prevented from being excessively small in linear fitting when the difference between the amplitude value of the grid connection voltage and the amplitude value of the target grid connection voltage is large due to an excessively small linear fitting coefficient, and the power station reactive power adjustment amount may also be prevented from being excessively large in linear fitting when the difference between the amplitude value of the grid connection voltage and the amplitude value of the target grid connection voltage is small due to an excessively large linear fitting coefficient.

It may be further understood that, in an application scenario, a larger difference between the frequency of the grid connection voltage and a frequency of the target grid connection voltage indicates a larger corresponding power station active power adjustment amount. The power station active power adjustment amount is not simply linearly related to the frequency of the grid connection voltage. When a difference between the frequency of the grid connection voltage and the frequency of the target grid connection voltage increases, a growth rate of the corresponding power station active power adjustment amount is greater than a growth rate of the difference between the frequency of the grid connection voltage and the frequency of the target grid connection voltage. Therefore, P2(f) (for example, a quadratic power function) is used as the function of the power station active power adjustment amount about the frequency of the grid connection voltage, so that the power station active power adjustment amount may be prevented from being excessively small in linear fitting when the difference between the frequency of the grid connection voltage and the frequency of the target grid connection voltage is large due to an excessively small linear fitting coefficient, and the power station active power adjustment amount may also be prevented from being excessively large in linear fitting when the difference between the frequency of the grid connection voltage and the frequency of the target grid connection voltage is small due to an excessively large linear fitting coefficient.

According to the implementations provided in the embodiments, Q2(u) (for example, a quadratic power function) is used as the function of the power station reactive power adjustment amount about the amplitude value of the grid connection voltage, so that the power station reactive power adjustment amount may be obtained more accurately based on the amplitude value of the grid connection voltage. A method is simple, and control precision and control efficiency are improved. P2(f) (for example, a quadratic power function) is used as the function of the power station active power adjustment amount about the frequency of the grid connection voltage, so that the power station active power adjustment amount may be obtained more accurately based on the frequency of the grid connection voltage. A method is simple, and control precision and control efficiency are improved.

With reference to the seventh possible implementation of the second aspect, in an eighth possible implementation, the output reactive power adjustment amount and the output active power adjustment amount satisfy:

$$Qout = Q1 + k1(Q2 - Q1)$$

$$Pout = P1 + k2(P2 - P1)$$

Herein, Qout is the output reactive power adjustment amount, Q1 is the inverter reactive power adjustment amount, Q2 is the power station reactive power adjustment amount, k1 is an output reactive power adjustment coefficient, Pout is the output active power adjustment amount, P1 is the inverter active power adjustment amount, P2 is the power station active power adjustment amount, and k2 is an output active power adjustment coefficient.

According to the implementations provided in the embodiments, the system may obtain the output reactive power adjustment amount Qout (that is, the target reactive power adjustment amount of the output power of the inverter) based on the power station reactive power adjustment amount Q1 and the inverter reactive power adjustment amount Q1, and may also obtain the output active power adjustment amount Pout (that is, the target active power adjustment amount of the output power of the inverter) based on the power station active power adjustment amount P1 and the inverter active power adjustment amount P1, and generate the output power adjustment signal (for example, a pulse width modulation signal or another control signal that may control the output power of the inverter) based on the output reactive power adjustment amount Qout and the output active power adjustment amount Pout. This improves control precision and adjustment efficiency, reduces control time, and reduces control costs.

DETAILED DESCRIPTION OF EMBODIMENTS

A power supply system provided in the embodiments may be applied to a plurality of application fields, including a new energy smart microgrid field, a power transmission and distribution field, a new energy field (for example, a photovoltaic grid connection field, a thermal grid connection field, or a wind grid connection field), a photovoltaic power generation field, a wind power generation field, a thermal power generation field, or a high-power converter field (for example, converting a direct current into a high-power high-voltage alternating current). This may be determined based on an actual application scenario, and is not limited herein. The power supply system provided in the embodiments may be applicable to a power supply system with different power generation apparatuses, such as a photovoltaic power supply system, a wind energy power supply system, a thermal power supply system, a nuclear energy power supply system, a chemical power supply system, or a biomass energy power supply system. This may be determined based on an actual application scenario, and is not limited herein. The power supply system provided in the embodiments may adapt to different application scenarios, for example, an application scenario in which a load in a solar storage power supply environment is powered, an application scenario in which a load in a wind storage power supply environment is powered, an application scenario in which a load in a pure energy storage power supply environment is powered, or another application scenario. The following uses the application scenario in which the load in the pure energy storage power supply environment is powered as an example for description. Details are not described below again.

Figure 1:
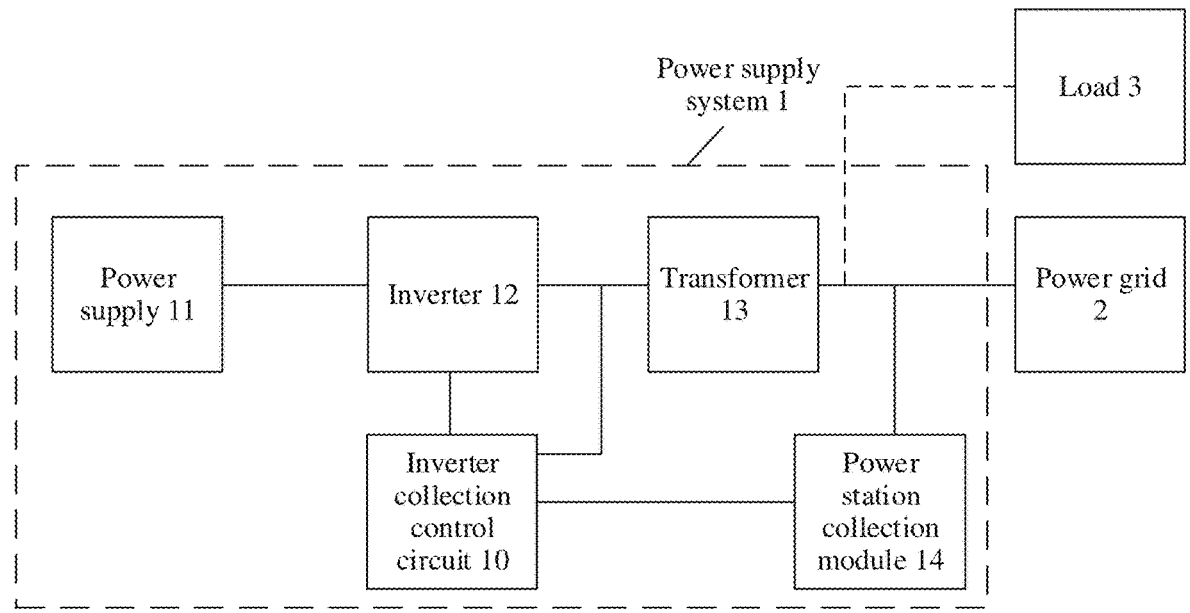
FIG. 1 is a schematic diagram of an application scenario of a power supply system according to an embodiment.

Refer to FIG. 1. FIG. 1 is a schematic diagram of an application scenario of a power supply system according to an embodiment. In an application scenario of pure energy storage power supply, as shown in FIG. 1, a power supply system 1 includes a power supply 11, an inverter 12, a transformer 13, a power station collection module 14, and an inverter collection control circuit 10. The power supply 11 may be connected to the transformer 13 through the inverter 12, the transformer 13 may be connected to a power grid 2 at a grid connection point, one end of the power station collection module 14 may be connected to the grid connection point, the other end of the power station collection module may be connected to a first end of the inverter collection control circuit 10, a second end of the inverter collection control circuit 10 may be connected between the inverter 12 and the transformer 13, and a third end of the inverter collection control circuit 10 may be connected to the inverter 12. In some implementations, the power supply 11 may supply power to the power grid 2 by using the inverter 12 and the transformer 13. In some implementations, the power supply 11 may alternatively be connected to a load 3 through the inverter 12 and the transformer 13, and supply power to the load 3 by using the inverter 12 and the transformer 13. Herein, the inverter 12 may convert direct current electric energy provided by the power supply 11 into alternating current electric energy. The transformer 13 may increase (or decrease) a voltage of the alternating current electric energy to a voltage value that matches the power grid 2 (or the load 3). In some implementations, the power supply 11 may alternatively be used as an energy storage apparatus. When power is not insufficient, the power supply 11 may obtain, by using the inverter 12 and the transformer 13, electric energy provided by the power grid 2 for storage. In the embodiments, an application scenario in which the power supply 11 supplies power to the power grid 2 (or the load 3) by using the inverter 12 and the transformer 13 is merely used as an example for description. Details are not described below again. It may be understood that, the power supply 11 provided in the embodiments is applicable to an application scenario in which a plurality of types of electric devices are powered, for example, a base station device in a remote area with no mains supply or with poor mains supply is powered, or a battery is powered, or a home device (such as a refrigerator or an air conditioner) is powered. This may be determined based on an actual application scenario, and is not limited herein. It may be further understood that, the power grid 2 in FIG. 1 may include a transmission line, a power transfer station, an electric device such as a battery, a communication base station, or a home device, or a power transmission device. The load 3 herein may include a load (an electric apparatus or a power transmission apparatus) whose voltage and current are in a nonlinear relationship in a running (power supply or power consumption) process, such as a motor or a rectifier device. It may be understood that, when the power grid 2 (or the load 3) runs, impedance at an end of the power grid 2 (or the load 3) can change, or when the power supply 11 is a new energy power supply station (for example, a photovoltaic power generation station), a power generation power may be unstable (for example, a light condition of a photovoltaic power generation station changes). In these scenarios (or another application scenario), a voltage and a frequency of a grid connection point at a connection point between the power supply system 1 and the power grid 2 fluctuate. This may increase a loss of a device or even endanger device safety. Herein, the power station collection module 14 may obtain an amplitude value and a frequency of a grid connection voltage at the grid connection point, and obtain a power station power adjustment signal based on the amplitude value and the frequency of the grid connection voltage. The inverter collection control circuit 10 may obtain an amplitude value and a frequency of an output voltage of the inverter 12, obtain an inverter power adjustment signal based on the amplitude value and the frequency of the output voltage, and control, based on the power station power adjustment signal and the inverter power adjustment signal, the inverter 12 to output a target output power. A structure is simple, and a control method is simple. This improves control precision and adjustment efficiency, reduces control time, and reduces control costs.

With reference to FIG. 2 to FIG. 10, the following describes the power supply system provided in the embodiments and an operating principle thereof.

Figure 2:
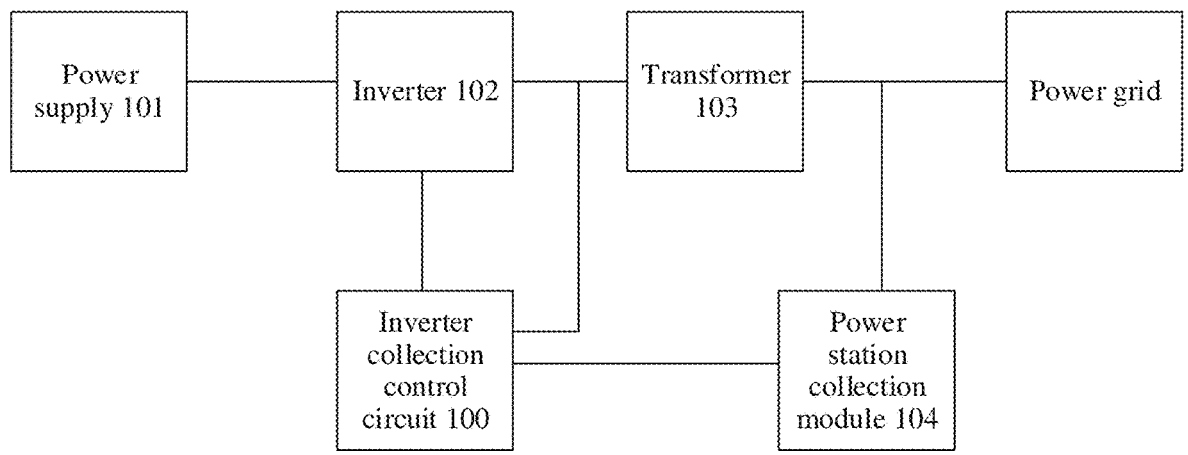
FIG. 2 is a schematic diagram of a structure of a power supply system according to an embodiment.

Refer to FIG. 2. FIG. 2 is a schematic diagram of a structure of a power supply system according to an embodiment. As shown in FIG. 2, the power supply system includes a power supply 101, an inverter 102, a transformer 103, a power station collection module 104, and an inverter collection control circuit 100. Herein, the power supply 101 may be connected to the transformer 103 through the inverter 102, the transformer 103 may be connected to a power grid at a grid connection point, one end of the power station collection module 104 may be connected to the grid connection point, the other end of the power station collection module 104 may be connected to a first end of the inverter collection control circuit 100, a second end of the inverter collection control circuit 100 may be connected between the inverter 102 and the transformer 103, and a third end of the inverter collection control circuit 100 may be connected to the inverter 102. The power station collection module 104 herein may be configured to obtain an amplitude value and a frequency of a grid connection voltage at the grid connection point, and obtain a power station power adjustment signal based on the amplitude value and the frequency of the grid connection voltage. The inverter collection control circuit 100 herein may be configured to obtain an amplitude value and a frequency of an output voltage of the inverter 102, obtain an inverter power adjustment signal based on the amplitude value and the frequency of the output voltage, and control, based on the power station power adjustment signal and the inverter power adjustment signal, the inverter 102 to output a target output power.

In the implementations provided in the embodiments, the power station collection module 104 may obtain the amplitude value and the frequency of the grid connection voltage at the grid connection point. Herein, the amplitude value and the frequency of the grid connection voltage are related to a power station power (that is, an output power of the power supply system at the grid connection point). The system may determine an adjustment amount of the power station power based on the amplitude value and the frequency of the grid connection voltage, to further obtain the power station power adjustment signal. The inverter collection control circuit 100 may obtain the amplitude value and the frequency of the output voltage of the inverter 102. Herein, the amplitude value and the frequency of the output voltage of the inverter 102 are related to an inverter power (that is, an output power of the inverter 102). The inverter collection control circuit 100 may determine an adjustment amount of the inverter power based on the amplitude value and the frequency of the output voltage of the inverter 102, to further obtain the inverter power adjustment signal. Because another functional module or an electric energy element (for example, the transformer 103) exists between an output end of the inverter 102 and the grid connection point, the inverter collection control circuit 100 may obtain a target adjustment amount of the output power of the inverter 102 jointly based on the power station power adjustment signal and the inverter power adjustment signal, and may control the inverter 102 to output the target output power.

According to the implementations provided in the embodiments, the system may collect the amplitude value and the frequency of the grid connection voltage at the grid connection point and the amplitude value and the frequency of the output voltage of the inverter 102 by using the power station collection module 104 and the inverter collection control circuit 100, and separately determine the power station power adjustment signal and the inverter power adjustment signal, to further adjust the output power of the inverter 102 based on the power station power adjustment signal and the inverter power adjustment signal. A structure is simple, and a control method is simple. This improves control precision and adjustment efficiency, reduces control time, and reduces control costs.

Figure 3:
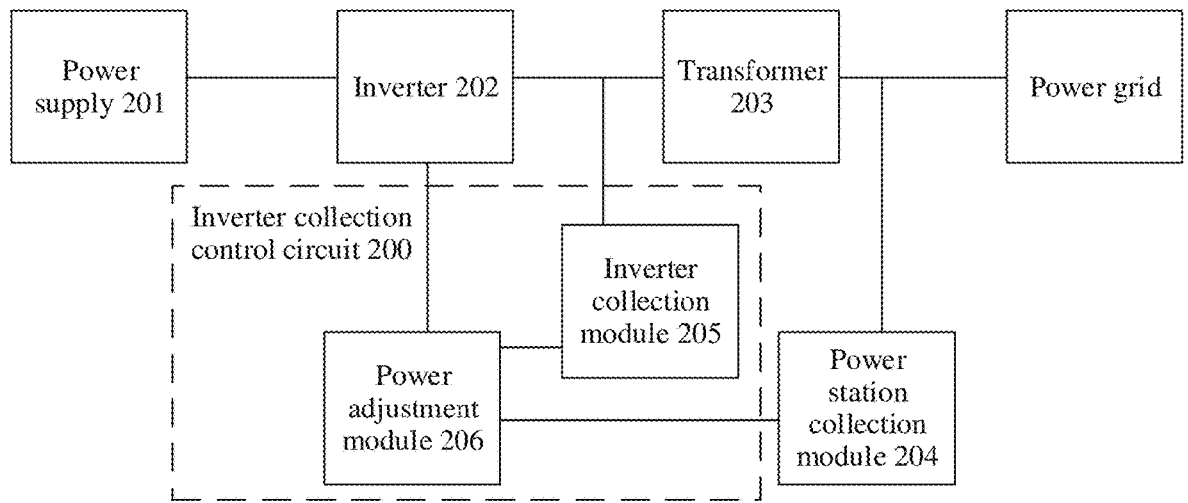
FIG. 3 is another schematic diagram of a structure of a power supply system according to an embodiment.

In some implementations, an inverter collection control circuit may include an inverter collection module and a power adjustment module. For example, refer to FIG. 3, FIG. 3 is another schematic diagram of a structure of a power supply system according to an embodiment. As shown in FIG. 3, an inverter collection control circuit 200 may include an inverter collection module 205 and a power adjustment module 206. Herein, a power supply 201 may be connected to a transformer 203 through an inverter 202, the transformer 203 may be connected to a power grid at a grid connection point, one end of a power station collection module 204 may be connected to the grid connection point, the other end of the power station collection module 204 may be connected to a first end of the inverter collection control circuit 200, a second end of the inverter collection control circuit 200 may be connected between the inverter 202 and the transformer 203, and a third end of the inverter collection control circuit 200 may be connected to the inverter 202. Herein, a first end of the power adjustment module 206 may be used as the first end of the inverter collection control circuit 200 and is connected to the power station collection module 204, one end of the inverter collection module 205 may be used as the second end of the inverter collection control circuit 200 and is connected between the inverter 202 and the transformer 203, the other end of the inverter collection module 205 may be connected to a second end of the power adjustment module 206, and a third end of the power adjustment module 206 may be used as the third end of the inverter collection control circuit 200 and is connected to the inverter 202. The inverter collection module 205 herein may be configured to obtain an amplitude value and a frequency of an output voltage of the inverter 202, obtain an inverter reactive power adjustment amount based on the amplitude value of the output voltage, obtain an inverter active power adjustment amount based on the frequency of the output voltage, and obtain an inverter power adjustment signal based on the inverter reactive power adjustment amount and the inverter active power adjustment amount. The power adjustment module 206 herein may be configured to generate an output power adjustment signal based on a power station power adjustment signal and the inverter power adjustment signal, and control, by using the output power adjustment signal, the inverter 202 to output a target output power. It may be understood that, after the inverter collection module 205 obtains the amplitude value and the frequency of the output voltage of the inverter 202, because the amplitude value of the output voltage of the inverter 202 is nonlinearly related to a reactive power adjustment amount of an inverter power (that is, an output power of the inverter 202), and the frequency of the output voltage of the inverter 202 is nonlinearly related to an active power adjustment amount of the inverter power (that is, the output power of the inverter 202), the inverter collection module 205 may determine the reactive power adjustment amount and the active power adjustment amount of the inverter power respectively based on the amplitude value and the frequency of the output voltage of the inverter 202, to further obtain the inverter power adjustment signal. It may be further understood that, the power adjustment module 206 may obtain a target adjustment amount of the output power of the inverter 202 jointly based on the power station power adjustment signal output by the power station collection module 204 and the inverter power adjustment signal output by the inverter collection control circuit 200, and may control the inverter 202 to output the target output power.

According to the implementations provided in the embodiments, the inverter collection module 205 may determine the reactive power adjustment amount and the active power adjustment amount of the inverter power respectively based on the amplitude value and the frequency of the output voltage of the inverter 202, to further obtain the inverter power adjustment signal. The power adjustment module 206 may obtain the target adjustment amount of the output power of the inverter 202 jointly based on the power station power adjustment signal output by the power station collection module 204 and the inverter power adjustment signal output by the inverter collection control circuit 200, and may control the inverter 202 to output the target output power. A structure is simple. In addition, the system may separately control a reactive power and an active power of the inverter 202. This improves control precision and adjustment efficiency, reduces control time, and reduces control costs.

In some implementations, the power station power adjustment signal may include a power station reactive power adjustment amount and a power station active power adjustment amount. The power station collection module 204 herein may be further configured to obtain the power station reactive power adjustment amount based on an amplitude value of a grid connection voltage, obtain the power station active power adjustment amount based on a frequency of the grid connection voltage, and output the power station reactive power adjustment amount and the power station active power adjustment amount to the inverter collection control circuit 200. It may be understood that, after the power station collection module 204 obtains the amplitude value and the frequency of the grid connection voltage, because the amplitude value of the grid connection voltage is nonlinearly related to a reactive power adjustment amount in a power station power (that is, an output power of the power supply system at the grid connection point), and the frequency of the grid connection voltage is nonlinearly related to an active power adjustment amount in the power station power (that is, the output power of the power supply system at the grid connection point), the power station collection module 204 may determine the reactive power adjustment amount and the active power adjustment amount of the power station power respectively based on the amplitude value and the frequency of the grid connection voltage at the grid connection point, to further output the power station reactive power adjustment amount and the power station active power adjustment amount to the inverter collection control circuit. According to the implementations provided in the embodiments, the power station collection module 204 may determine the reactive power adjustment amount and the active power adjustment amount of the power station power respectively based on the amplitude value and the frequency of the grid connection voltage of the grid connection point, to further output the reactive power adjustment amount and the active power adjustment amount of the power station power as the power station power adjustment signal to the power adjustment module 206 in the inverter collection control circuit. Therefore, the power adjustment module 206 may obtain a target reactive power adjustment amount of the output power of the inverter 202 based on the power station reactive power adjustment amount and the inverter reactive power adjustment amount, and may also obtain a target active power adjustment amount of the output power of the inverter 202 based on the power station active power adjustment amount and the inverter active power adjustment amount, and may control the inverter 202 to output the target output power (herein, the target output power may include a target reactive power and a target active power). A structure is simple. In addition, the system may control the inverter 202 to separately output the target reactive power and/or the target active power. This improves control precision and adjustment efficiency, reduces control time, and reduces control costs.

In some implementations, the inverter reactive power adjustment amount and the inverter active power adjustment amount satisfy the following formulas:

$$d^2 Q1(u)/du^2 < 0 \qquad (1)$$

$$d^2 P1(f)/df^2 < 0 \qquad (2)$$

Herein, Q1(u) is a function of the inverter reactive power adjustment amount about the amplitude value of the output voltage, $d^2Q1(u)/du^2$ is a second derivative of the inverter reactive power adjustment amount about the amplitude value of the output voltage, P1(f) is a function of the inverter active power adjustment amount about the frequency of the output voltage, and $d^2P1(f)/df^2$ is a second derivative of the inverter active power adjustment amount about the frequency of the output voltage.

It may be understood that, in an application scenario, a larger difference between the amplitude value of the output voltage and an amplitude value of a target output voltage indicates a larger corresponding inverter reactive power adjustment amount. The inverter reactive power adjustment amount is not simply linearly related to the amplitude value of the output voltage. When a difference between the amplitude value of the output voltage and the amplitude value of the target output voltage increases, a growth rate of the corresponding inverter reactive power adjustment amount is greater than a growth rate of the difference between the amplitude value of the output voltage and the amplitude value of the target output voltage. Therefore, Q1(u) (for example, a quadratic power function) is used as a fitting function of the inverter reactive power adjustment amount about the amplitude value of the output voltage, so that the inverter reactive power adjustment amount may be prevented from being excessively small in linear fitting when the difference between the amplitude value of the output voltage and the amplitude value of the target output voltage is large due to an excessively small linear fitting coefficient, and the inverter reactive power adjustment amount may also be prevented from being excessively large in linear fitting when the difference between the amplitude value of the output voltage and the amplitude value of the target output voltage is small due to an excessively large linear fitting coefficient.

It may be further understood that, in an application scenario, a larger difference between the frequency of the output voltage and a frequency of the target output voltage indicates a larger corresponding inverter active power adjustment amount. The inverter active power adjustment amount is not simply linearly related to the frequency of the output voltage. When a difference between the frequency of the output voltage and the frequency of the target output voltage increases, a growth rate of the corresponding inverter active power adjustment amount is greater than a growth rate of the difference between the frequency of the output voltage and the frequency of the target output voltage. Therefore, P1(f) (for example, a quadratic power function) is used as the function of the inverter active power adjustment amount about the frequency of the output voltage, so that the inverter active power adjustment amount may be prevented from being excessively small in linear fitting when the difference between the frequency of the output voltage and the frequency of the target output voltage is large due to an excessively small linear fitting coefficient, and the inverter active power adjustment amount may also be prevented from being excessively large in linear fitting when the difference between the frequency of the output voltage and the frequency of the target output voltage is small due to an excessively large linear fitting coefficient.

In some implementations, the inverter reactive power adjustment amount and the inverter active power adjustment amount may satisfy the following formulas:

$$Q1 = k11 \cdot (U0 - U1)^2 \quad (3)$$

$$P1 = k12 \cdot (f0 - f1)^2 \quad (4)$$

Q1 is the inverter reactive power adjustment amount, U0 is the amplitude value of the target output voltage, U1 is the amplitude value of the output voltage, k11 is an inverter reactive power adjustment coefficient, P1 is the inverter reactive power adjustment amount, f0 is the frequency of the target output voltage, f1 is the frequency of the output voltage, and k12 is an inverter active power adjustment coefficient.

According to the implementations provided in the embodiments, Q1(u) (for example, a quadratic power function shown in Formula 3) is used as the function of the inverter reactive power adjustment amount about the amplitude value of the output voltage, so that the inverter reactive power adjustment amount may be obtained more accurately based on the amplitude value of the output voltage. A method is simple, and control precision and control efficiency are improved. P1(f) (for example, a quadratic power function shown in Formula 4) is used as the function of the inverter active power adjustment amount about the frequency of the output voltage, so that the inverter active power adjustment amount may be obtained more accurately based on the frequency of the output voltage. A method is simple, and control precision and control efficiency are improved.

In some implementations, the power station reactive power adjustment amount and the inverter active power adjustment amount satisfy the following formulas:

$$d^2Q2(u)/du^2 < 0 \quad (5)$$

$$d^2P2(f)/df^2 < 0 \quad (6)$$

Herein, Q2(u) is a function of the power station reactive power adjustment amount about the amplitude value of the grid connection voltage, $d^2Q2(u)/du^2$ is a second derivative of the power station reactive power adjustment amount about the amplitude value of the grid connection voltage, P2(f) is a function of the power station active power adjustment amount about the frequency of the grid connection voltage, and $d^2P2(f)/df^2$ is a second derivative of the power station active power adjustment amount about the frequency of the grid connection voltage.

It may be understood that, in an application scenario, a larger difference between the amplitude value of the grid connection voltage and an amplitude value of a target grid connection voltage indicates a larger corresponding power station reactive power adjustment amount. The power station reactive power adjustment amount is not simply linearly related to the amplitude value of the grid connection voltage. When the difference between the amplitude value of the grid connection voltage and the amplitude value of the target grid connection voltage increases, a growth rate of the corresponding power station reactive power adjustment amount is greater than a growth rate of the difference between the amplitude value of the grid connection voltage and the amplitude value of the target grid connection voltage. Therefore, Q2(u) (for example, a quadratic power function) is used as a fitting function of the power station reactive power adjustment amount about the amplitude value of the grid connection voltage, so that the power station reactive power adjustment amount may be prevented from being excessively small in linear fitting when the difference between the amplitude value of the grid connection voltage and the amplitude value of the target grid connection voltage is large due to an excessively small linear fitting coefficient, and the power station reactive power adjustment amount may also be prevented from being excessively large in linear fitting when the difference between the amplitude value of the grid connection voltage and the amplitude value of the target grid connection voltage is small due to an excessively large linear fitting coefficient.

Figure 4:
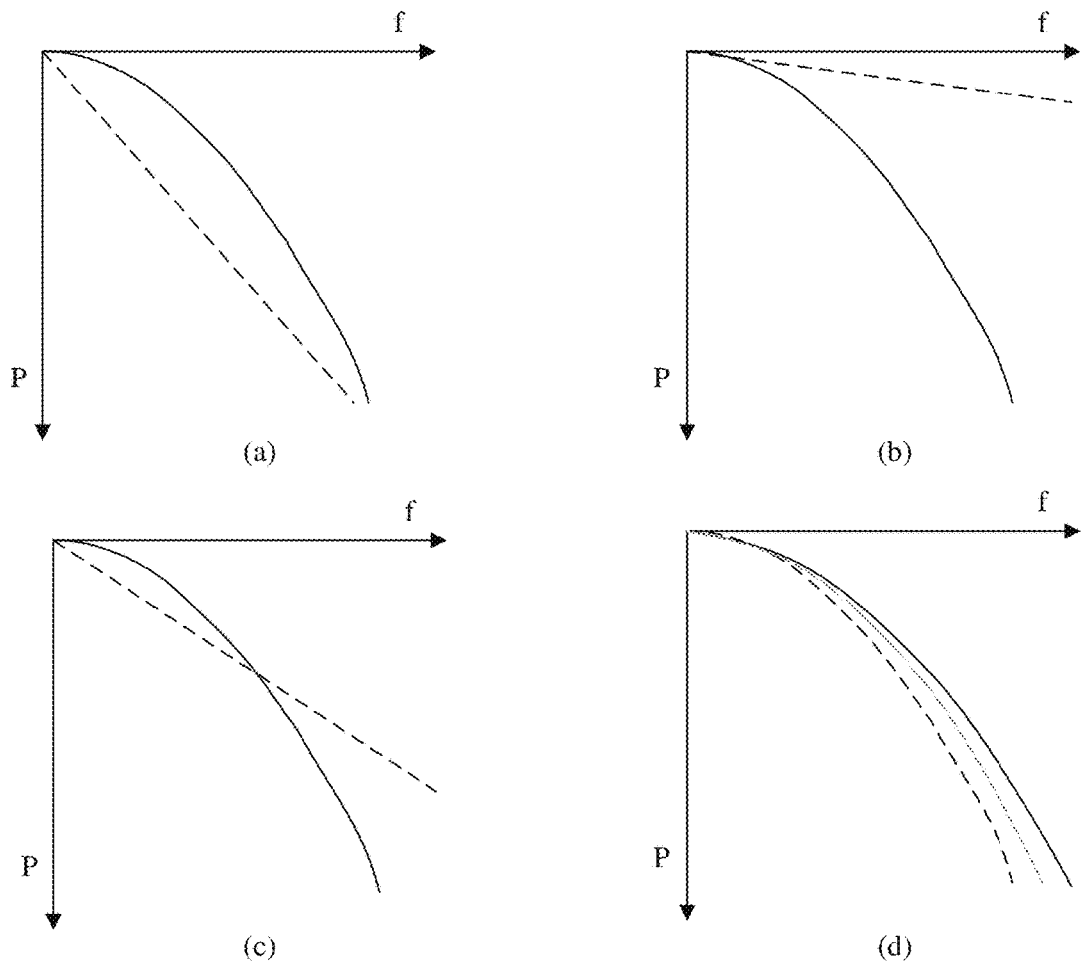
FIG. 4 is a schematic diagram of a relationship between a power station active power adjustment amount of a power supply system and a frequency according to an embodiment.

It may be further understood that, in an application scenario, a larger difference between the frequency of the grid connection voltage and a frequency of the target grid connection voltage indicates a larger corresponding power station active power adjustment amount. The power station active power adjustment amount is not simply linearly related to the frequency of the grid connection voltage. When a difference between the frequency of the grid connection voltage and the frequency of the target grid connection voltage increases, a growth rate of the corresponding power station active power adjustment amount is greater than a growth rate of the difference between the frequency of the grid connection voltage and the frequency of the target grid connection voltage. Refer to FIG. 4. FIG. 4 is a schematic diagram of a relationship between a power station active power adjustment amount of a power supply system and a frequency according to an embodiment. As shown in a part (a) in FIG. 4, a dashed line is a curve that is of the power station active power adjustment amount about the frequency of the grid connection voltage and that is obtained through fitting by using a linear function, and a solid line is a curve of the power station active power adjustment amount about the frequency of the grid connection voltage in an actual application scenario. A linear fitting coefficient shown by the dashed line in the part (a) in FIG. 4 is excessively large. When the difference between the frequency of the grid connection voltage and the frequency of the target grid connection voltage is small, the power station active power adjustment amount is excessively large. If linear fitting is performed based on the dashed line, an error between an obtained power station active power adjustment amount and an actually required power station active power adjustment amount is large. As shown in a part (b) in FIG. 4, a dashed line is a curve that is of the power station active power adjustment amount about the frequency of the grid connection voltage and that is obtained through fitting by using a linear function, and a solid line is a curve of the power station active power adjustment amount about the frequency of the grid connection voltage in an actual application scenario. A linear fitting coefficient shown by the dashed line in the part (b) in FIG. 4 is excessively small. When the difference between the frequency of the grid connection voltage and the frequency of the target grid connection voltage is large, the power station active power adjustment amount is excessively small. If linear fitting is performed based on the dashed line, an error between an obtained power station active power adjustment amount and an actually required power station active power adjustment amount is also large. As shown in a part (c) in FIG. 4, a dashed line is a curve that is of the power station active power adjustment amount about the frequency of the grid connection voltage and that is obtained through fitting by using a linear function, and a solid line is a curve of the power station active power adjustment amount about the frequency of the grid connection voltage in an actual application scenario. A linear fitting coefficient shown by the dashed line in the part (c) in FIG. 4 is moderate, but an error between a power station active power adjustment amount obtained through linear fitting based on the dashed line, and an actually required power station active power adjustment amount is still large. It can be understood that a large error between a power station active power adjustment amount obtained through linear fitting and an actually required power station active power adjustment amount keeps existing. In the embodiments, as shown in a part (d) in FIG. 4, a dashed line is a curve that is of the power station active power adjustment amount about the frequency of the grid connection voltage and that is obtained through fitting by using a nonlinear function, and a black solid line is a curve of the power station active power adjustment amount about the frequency of the grid connection voltage in an actual application scenario. It can be understood that an error between the curve that is of the power station active power adjustment amount about the frequency of the grid connection voltage and that is obtained through fitting by using the nonlinear function and the curve of the power station active power adjustment amount about the frequency of the grid connection voltage in the actual application scenario is small. This improves control precision of the system.

Therefore, P2(f) (for example, a quadratic power function) is used as the function of the power station active power adjustment amount about the frequency of the grid connection voltage, so that the power station active power adjustment amount may be prevented from being excessively small in linear fitting when the difference between the frequency of the grid connection voltage and the frequency of the target grid connection voltage is large due to an excessively small linear fitting coefficient, and the power station active power adjustment amount may also be prevented from being excessively large in linear fitting when the difference between the frequency of the grid connection voltage and the frequency of the target grid connection voltage is small due to an excessively large linear fitting coefficient.

In some implementations, the power station reactive power adjustment amount and the inverter active power adjustment amount may satisfy the following formulas:

$$Q2 = k21 \cdot (Uc - U2)^2 \qquad (7)$$

$$P2 = k22 \cdot (fc - f2)^2 \qquad (8)$$

Q2 is the power station reactive power adjustment amount, Uc is the amplitude value of the target grid connection voltage, U2 is the amplitude value of the grid connection voltage, k21 is a power station reactive power adjustment coefficient, P2 is the power station active power adjustment amount, fc is the frequency of the target grid connection voltage, f2 is the frequency of the grid connection voltage, and k22 is a power station active power adjustment coefficient.

According to the implementations provided in the embodiments, Q2(u) (for example, a quadratic power function shown in Formula 7) is used as the function of the power station reactive power adjustment amount about the amplitude value of the grid connection voltage, so that the power station reactive power adjustment amount may be obtained more accurately based on the amplitude value of the grid connection voltage. A method is simple, and control precision and control efficiency are improved. P2(f) (for example, a quadratic power function shown in Formula 8) is used as the function of the power station active power adjustment amount about the frequency of the grid connection voltage, so that the power station active power adjustment amount may be obtained more accurately based on the frequency of the grid connection voltage. A method is simple, and control precision and control efficiency are improved.

In some implementations, the output reactive power adjustment amount and the output active power adjustment amount satisfy the following formulas:

$$Qout = Q1 + k1(Q2 - Q1) \qquad (9)$$

$$Pout = P1 + k2(P2 - P1) \qquad (10)$$

Herein, Qout is the output reactive power adjustment amount, Q1 is the inverter reactive power adjustment amount, Q2 is the power station reactive power adjustment amount, k1 is an output reactive power adjustment coefficient, Pout is the output active power adjustment amount, P1 is the inverter active power adjustment amount, P2 is the power station active power adjustment amount, and k2 is an output active power adjustment coefficient.

Refer to FIG. 4 again. As shown in the part (d) in FIG. 4, a gray solid line is a curve that is of the output active power adjustment amount about the frequency of the grid connection voltage and that is obtained based on both the power station active power adjustment amount and the inverter active power adjustment amount. The system may obtain the curve of the output active power adjustment amount about the frequency of the grid connection voltage based on both the power station active power adjustment amount and the inverter active power adjustment amount. This further reduces an error between the curve of the output active power adjustment amount about the frequency of the grid connection voltage and the curve of the power station active power adjustment amount about the frequency of the grid connection voltage in the actual application scenario, and further improves control precision of the system.

According to the implementations provided in the embodiments, the system may obtain the output reactive power adjustment amount Qout (that is, the target reactive power adjustment amount of the output power of the inverter) based on the power station reactive power adjustment amount Q1 and the inverter reactive power adjustment amount Q1, and may also obtain the output active power adjustment amount Pout (that is, the target active power adjustment amount of the output power of the inverter) based on the power station active power adjustment amount P1 and the inverter active power adjustment amount P1, and generate the output power adjustment signal (for example, a pulse width modulation signal or another control signal that may control the output power of the inverter) based on the output reactive power adjustment amount Qout and the output active power adjustment amount Pout. This improves control precision and adjustment efficiency, reduces control time, and reduces control costs.

In some implementations, the power station power adjustment signal may include an amplitude value and a frequency of a grid connection voltage. The power station collection module 204 herein may be further configured to obtain the amplitude value and the frequency of the grid connection voltage at the grid connection point, and output the amplitude value and the frequency of the grid connection voltage at the grid connection point to the inverter collection control circuit 200. Herein, in a scenario in which a communication speed (or a frequency) of the power station collection module 204 and the inverter collection control circuit 200 is limited, or in another scenario in which real-time communication between the power station collection module 204 and the inverter collection control circuit 200 is inconvenient, the power station collection module 204 may obtain the amplitude value and the frequency of the grid connection voltage at the grid connection point, and output the amplitude value and the frequency of the grid connection voltage at the grid connection point to the inverter collection control circuit 200. The inverter collection control circuit 200 determines an adjustment amount of a power station power based on the amplitude value and the frequency of the grid connection voltage. According to the implementations provided in the embodiments, in the scenario in which the communication speed (or the frequency) between the power station collection module 204 and the inverter collection control circuit 200 is limited, or in another scenario in which the real-time communication between the power station collection module 204 and the inverter collection control circuit 200 is inconvenient, the system may output the amplitude value and the frequency of the grid connection voltage at the grid connection point to the inverter collection control circuit 200 by using the inverter collection control circuit 200, and the inverter collection control circuit 200 determines the adjustment amount of the power station based on the amplitude value and the frequency of the grid connection voltage. A method is simple and flexible, has high applicability, and enriches application scenarios and an application scope of the system.

Figure 5:
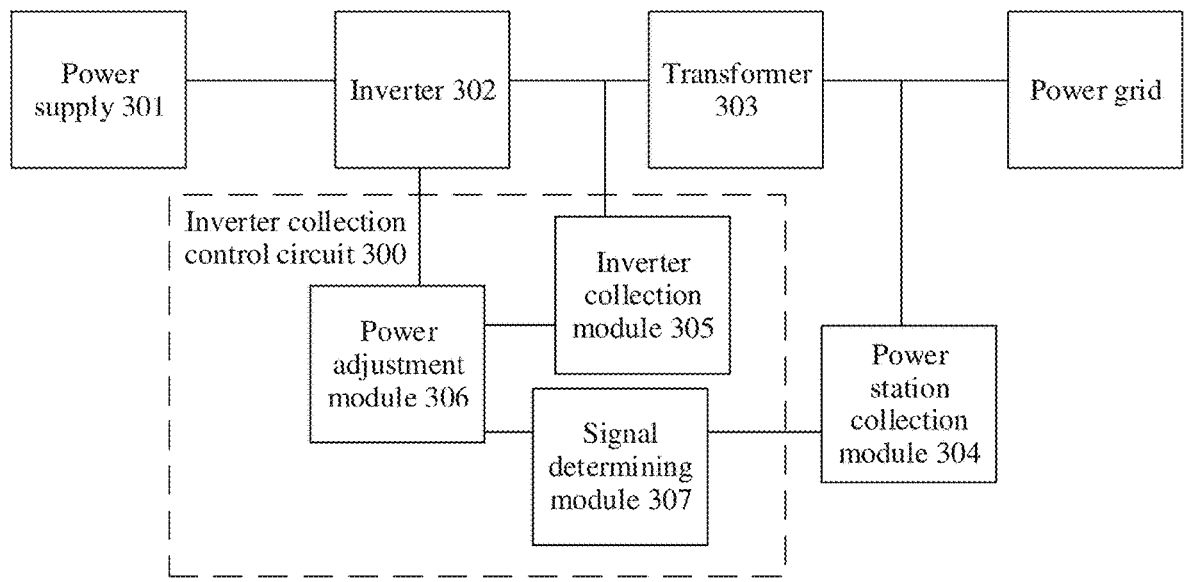
FIG. 5 is another schematic diagram of a structure of a power supply system according to an embodiment.

In some implementations, the inverter collection control circuit may further include a signal determining module. Refer to FIG. 5. FIG. 5 is another schematic diagram of a structure of a power supply system according to an embodiment. As shown in FIG. 5, an inverter collection control circuit 300 may further include a signal determining module 307. Herein, a power supply 301 may be connected to a transformer 303 through an inverter 302, the transformer 303 may be connected to a power grid at a grid connection point, one end of a power station collection module 304 may be connected to the grid connection point, the other end of the power station collection module 304 may be connected to a first end of the inverter collection control circuit 300, a second end of the inverter collection control circuit 300 may be connected between the inverter 302 and the transformer 303, and a third end of the inverter collection control circuit 300 may be connected to the inverter 302. Herein, a first end of a power adjustment module 306 may be used as the first end of the inverter collection control circuit 300 and is connected to the power station collection module 304, one end of an inverter collection module 305 may be used as the second end of the inverter collection control circuit 300 and is connected between the inverter 302 and the transformer 303, the other end of the inverter collection module 305 may be connected to a second end of the power adjustment module 306, and a third end of the power adjustment module 306 may be used as the third end of the inverter collection control circuit 300 and is connected to the inverter 302. Herein, the first end of the power adjustment module 306 may be connected to the power station collection module 304 through the signal determining module 307. The signal determining module 307 herein may be configured to obtain a power station reactive power adjustment amount based on an amplitude value of a grid connection voltage, obtain a power station active power adjustment amount based on a frequency of the grid connection voltage, and output the power station reactive power adjustment amount and the power station active power adjustment amount to the power adjustment module 306. Herein, in a scenario in which a communication speed (or a frequency) between the power station collection module 304 and the inverter collection control circuit 300 is limited, or in another scenario in which real-time communication between the power station collection module 304 and the inverter collection control circuit 300 is inconvenient, or in another scenario in which the power station collection module 304 directly transmits the amplitude value and the frequency of the grid connection voltage to the inverter collection control circuit 300, the signal determining module 307 may determine a reactive power adjustment amount and an active power adjustment amount of a power station power respectively based on the amplitude value and the frequency of the grid connection voltage of the grid connection point, to further output the reactive power adjustment amount and the active power adjustment amount of the power station power as a power station power adjustment signal to the power adjustment module 306 in the inverter collection control circuit. Therefore, the power adjustment module 306 may obtain a target reactive power adjustment amount of an output power of the inverter 302 jointly based on the power station reactive power adjustment amount and an inverter reactive power adjustment amount, and may also obtain a target active power adjustment amount of the output power of the inverter 302 jointly based on the power station active power adjustment amount and an inverter active power adjustment amount, and may control the inverter 302 to output a target output power (herein, the target output power may include a target reactive power and a target active power). A structure is simple. In addition, the inverter 302 may be controlled to separately output the target reactive power and/or the target active power. This improves control precision and adjustment efficiency, reduces control time, and reduces control costs.

According to the implementations provided in the embodiments, in the scenario in which the communication speed (or the frequency) between the power station collection module 304 and the inverter collection control circuit 300 is limited, or in another scenario in which the real-time communication between the power station collection module 304 and the inverter collection control circuit 300 is inconvenient, or in another scenario in which the power station collection module 304 directly transmits the amplitude value and the frequency of the grid connection voltage to the inverter collection control circuit 300, the signal determining module 307 may determine the reactive power adjustment amount and the active power adjustment amount of the power station power respectively based on the amplitude value and the frequency of the grid connection voltage of the grid connection point, to further output the reactive power adjustment amount and the active power adjustment amount of the power station power as the power station power adjustment signal to the power adjustment module 306 in the inverter collection control circuit. A method is simple and flexible, has high applicability, and enriches the application scenarios and the application scope of the system. The power adjustment module 306 may obtain the target reactive power adjustment amount of the output power of the inverter 302 jointly based on the power station reactive power adjustment amount and the inverter reactive power adjustment amount, and may also obtain the target active power adjustment amount of the output power of the inverter 302 jointly based on the power station active power adjustment amount and the inverter active power adjustment amount, and may control the inverter 302 to output the target output power (herein, the target output power may include the target reactive power and the target active power). A structure is simple. In addition, the system may control the inverter 302 to separately output the target reactive power and/or the target active power. This improves control precision and adjustment efficiency, reduces control time, and reduces control costs.

Figure 6:
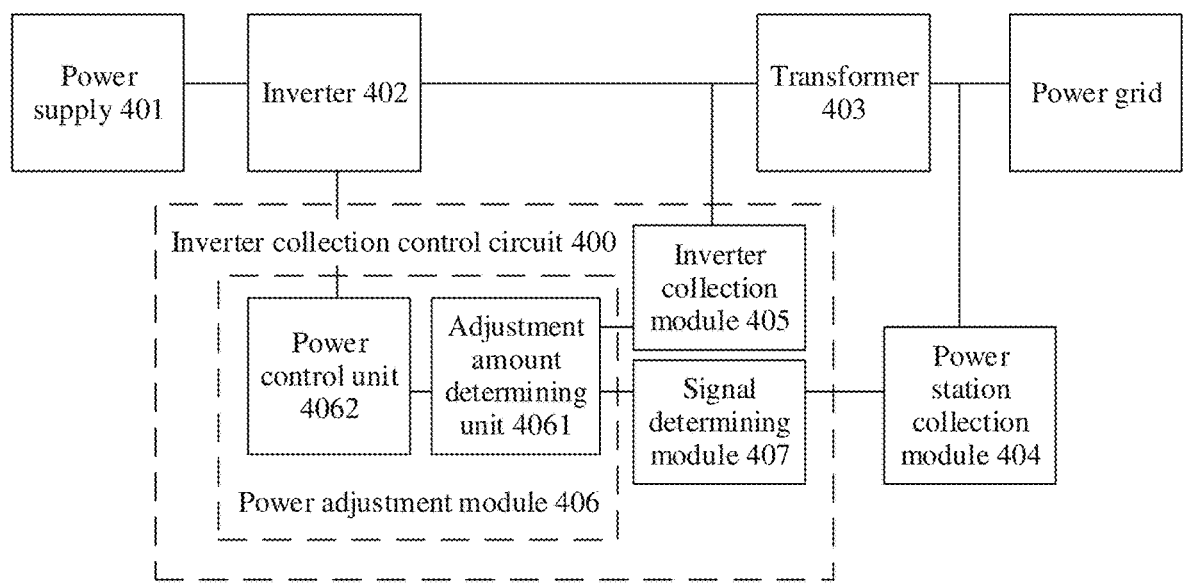
FIG. 6 is another schematic diagram of a structure of a power supply system according to an embodiment.

In some implementations, the power adjustment module may further include an adjustment amount determining unit and a power control unit. Refer to FIG. 6. FIG. 6 is another schematic diagram of a structure of a power supply system according to an embodiment. As shown in FIG. 6, a power adjustment module 406 may further include an adjustment amount determining unit 4061 and a power control unit 4062. Herein, a power supply 401 may be connected to a transformer 403 through an inverter 402, the transformer 403 may be connected to a power grid at a grid connection point, one end of a power station collection module 404 may be connected to the grid connection point, the other end of the power station collection module 404 may be connected to a first end of an inverter collection control circuit 400, a second end of the inverter collection control circuit 400 may be connected between the inverter 402 and the transformer 403, and a third end of the inverter collection control circuit 400 may be connected to the inverter 402. Herein, a first end of a power adjustment module 406 may be used as the first end of the inverter collection control circuit 400 and is connected to the power station collection module 404, one end of an inverter collection module 405 may be used as the second end of the inverter collection control circuit 400 and is connected between the inverter 402 and the transformer 403, the other end of the inverter collection module 405 may be connected to a second end of the power adjustment module 406, and a third end of the power adjustment module 406 may be used as the third end of the inverter collection control circuit 400 and is connected to the inverter 402. Herein, the first end of the power adjustment module 406 may be connected to the power station collection module 404 through a signal determining module 407. Herein, the power control unit 4062 is connected to the inverter 402 and one end of the adjustment amount determining unit 4061, and the other end of the adjustment amount determining unit 4061 is connected to the inverter collection module 405, or the other end of the adjustment amount determining unit 4061 is connected to the signal determining module 407. The adjustment amount determining unit 4061 herein may be configured to obtain an output reactive power adjustment amount based on a power station reactive power adjustment amount and an inverter reactive power adjustment amount, obtain an output active power adjustment amount based on a power station active power adjustment amount and an inverter active power adjustment amount, and generate an output power adjustment signal based on the output reactive power adjustment amount and the output active power adjustment amount. The power control unit 4062 herein may be configured to control, by using the output power adjustment signal, the inverter 402 to output a target output power. Herein, the adjustment amount determining unit 4061 (for example, a proportional integral amplification circuit) may obtain the output reactive power adjustment amount (that is, a target reactive power adjustment amount of an output power of the inverter 402) based on the power station reactive power adjustment amount and the inverter reactive power adjustment amount, and may also obtain the output active power adjustment amount (that is, a target active power adjustment amount of the output power of the inverter 402) based on the power station active power adjustment amount and the inverter active power adjustment amount, and generate the output power adjustment signal (for example, a pulse width modulation signal or another control signal that may control the output power of the inverter 402) based on the output reactive power adjustment amount and the output active power adjustment amount. Herein, the power control unit 4062 may control, by using the output power adjustment signal, the inverter 402 to output the target output power (herein, the target output power may include a target reactive power and a target active power). This improves control precision and adjustment efficiency, reduces control time, and reduces control costs.

In some implementations, the power supply system may further include a direct current bus. A power supply 501 may be connected to a power grid through a direct current bus, an inverter 502, and a transformer 503. Herein, the direct current bus may include one bus capacitor or a plurality of bus capacitors connected in series to each other, and may be used for energy storage. The direct current bus may include a bus capacitor C. The inverter 502 may convert electric energy that is output by the power supply 501 and that is stored at two ends of the bus capacitor C, and output a corresponding current and voltage to maintain working of the power grid.

Figure 7:
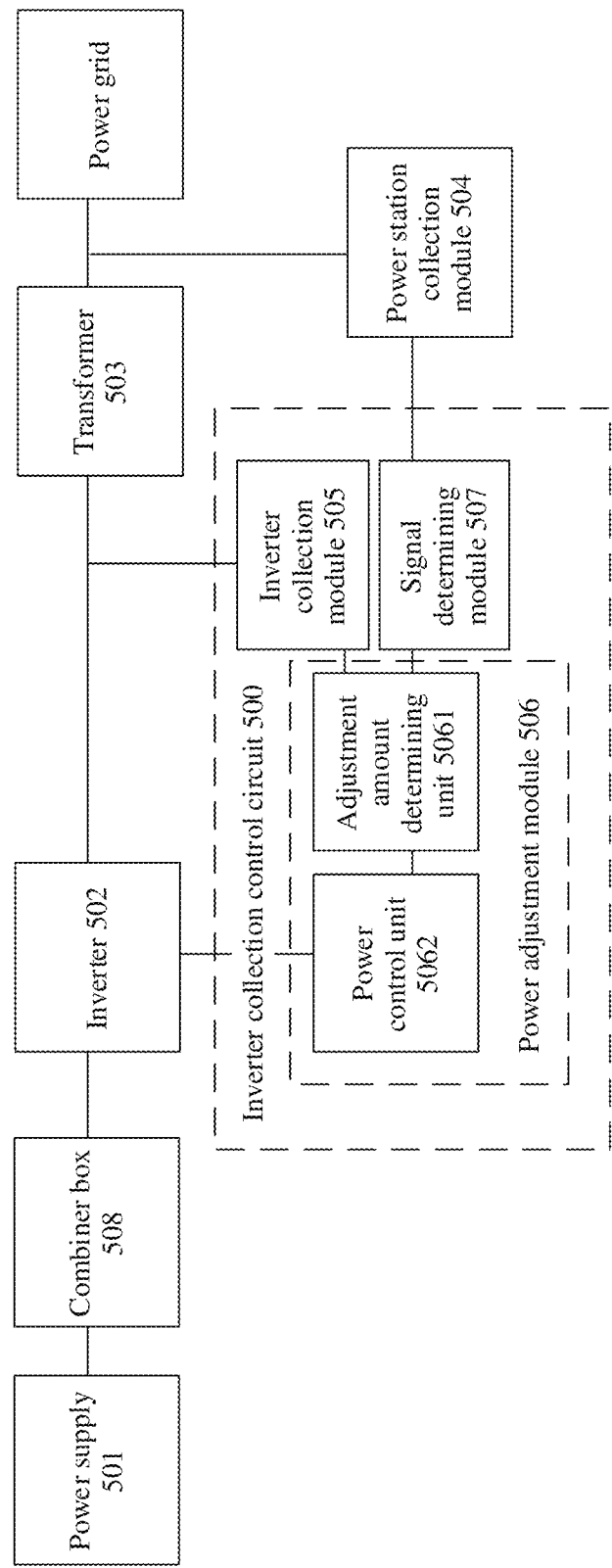
FIG. 7 is another schematic diagram of a structure of a power supply system according to an embodiment.

Refer to FIG. 7. FIG. 7 is another schematic diagram of a structure of a power supply system according to an embodiment. A power supply system shown in FIG. 7 may further include a combiner box 508, and the power supply 501 in the power supply system may be connected to the inverter 502 through the combiner box 508. It may be understood that, the power supply 501 in the power supply system may be connected to the combiner box 508 and then directly connected to the inverter 502 through the combiner box 508, or may be connected to the direct current bus through the combiner box 508 and connected to the inverter 502 through the direct current bus. This may be set according to an actual application scenario, and is not limited herein. Connection manners and working principles of the power supply 501, the inverter 502, the transformer 503, an inverter collection control circuit 500 (including an inverter collection module 505 and a power adjustment module 506 (including an adjustment amount determining unit 5061 and a power control unit 5062)), a power station collection module 504, the inverter collection module 505, and a signal determining module 507 in FIG. 7 are the same as foregoing connection manners and working principles of the power supply 401, the inverter 402, the transformer 403, the inverter collection control circuit 400 (including the inverter collection module 405 and the power adjustment module 406 (including the adjustment amount determining unit 4061 and the power control unit 4062)), the power station collection module 404, the inverter collection module 405, and the signal determining module 407 in FIG. 6, and are not described herein again.

Figure 8:
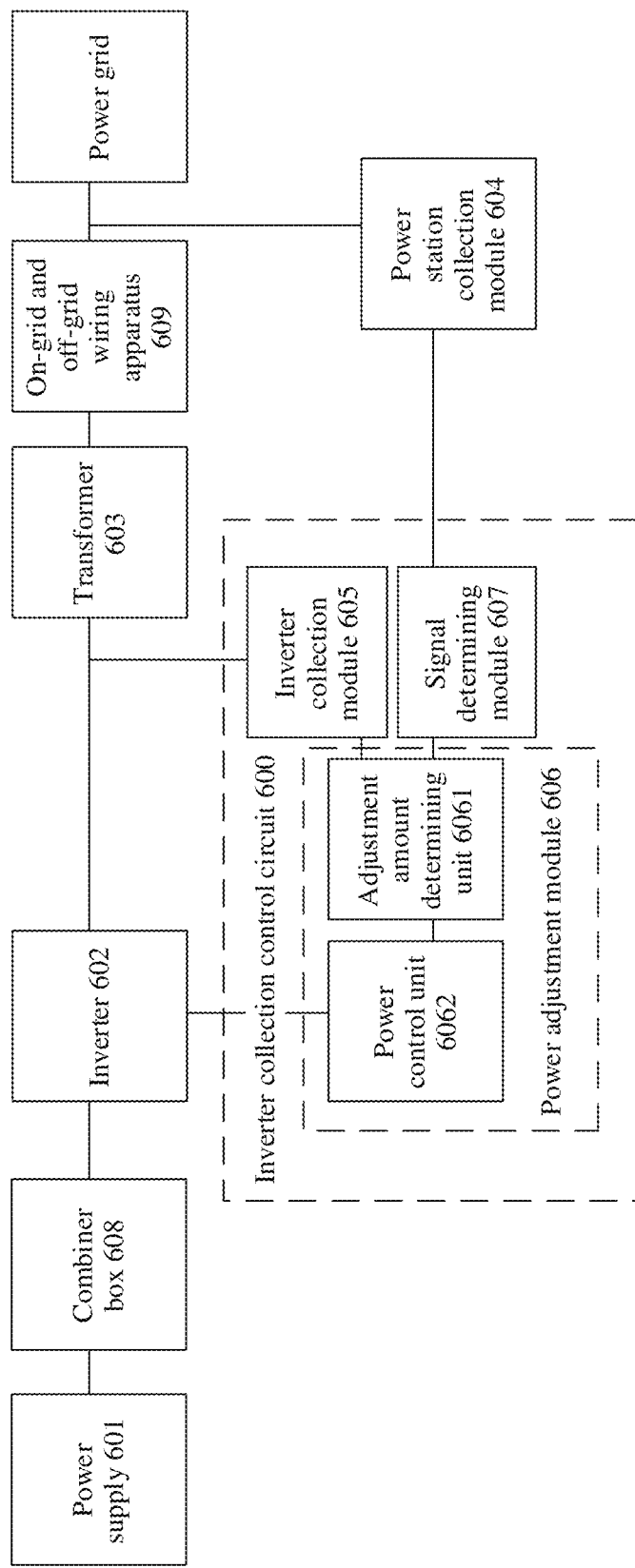
FIG. 8 is another schematic diagram of a structure of a power supply system according to an embodiment.

Refer to FIG. 8. FIG. 8 is another schematic diagram of a structure of a power supply system according to an embodiment. As shown in FIG. 8, a power supply system may further include an on-grid and off-grid wiring apparatus 609. A power supply 601 may supply power to a transmission line, a power transfer station, an electric device such as a battery, a communication base station, or a home device, or a power transmission device in a power grid by using an inverter 602, a transformer 603, and the on-grid and off-grid wiring apparatus 609. Connection manners and working principles of the power supply 601, the inverter 602, the transformer 603, an inverter collection control circuit 600 (including an inverter collection module 605 and a power adjustment module 606 (including an adjustment amount determining unit 6061 and a power control unit 6062)), a power station collection module 604, the inverter collection module 605, a signal determining module 607, and a combiner box 608 in FIG. 8 are the same as foregoing connection manners and working principles of the power supply 501, the inverter 502, the transformer 503, the inverter collection control circuit 500 (including the inverter collection module 505 and the power adjustment module 506 (including the adjustment amount determining unit 5061 and the power control unit 5062)), the power station collection module 504, the inverter collection module 505, the signal determining module 507, and the combiner box 508 in FIG. 7, and are not described herein again.

In the embodiments, functional modules in the power supply system have diversified and flexible composition manners, and can adapt to different power supply environments. This improves diversity of application scenarios of the power supply system and enhances adaptability of the power supply system. In addition, in any power supply system shown in FIG. 1 to FIG. 8 (or the power station collection module connected to the grid connection point in the power supply system and the inverter collection control circuit of the power supply system), the power supply system (or the power station collection module connected to the grid connection point in the power supply system and the inverter collection control circuit of the power supply system) may provide a harmonic current for a nonlinear load by using the inverter in the power supply system. This improves a sine degree of a current of the grid connection point, improves an electric energy quality of the power supply system, prolongs a service life of a component, and reduces costs. For case of description, the following uses the structure of the power supply system shown in FIG. 2 as an example to describe a power supply method of the power supply system provided in embodiments.

Figure 9:
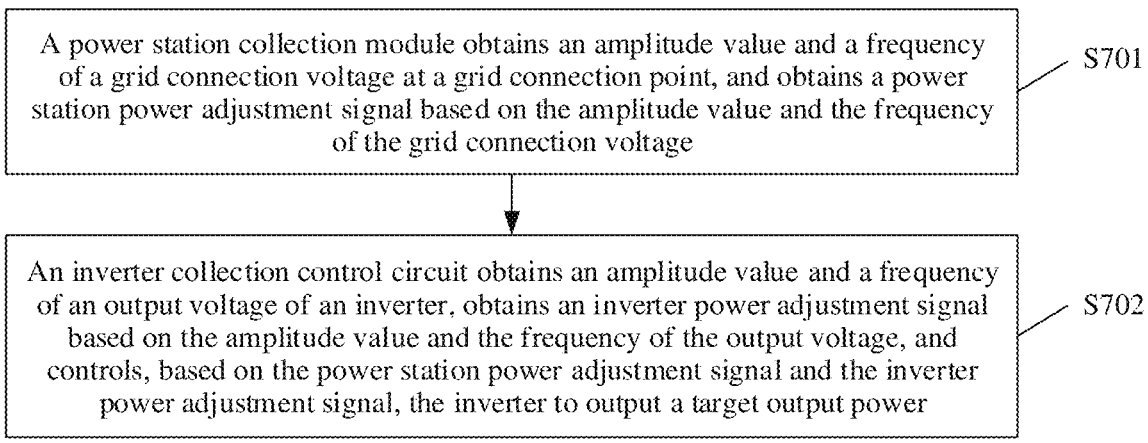
FIG. 9 is a schematic flowchart of a grid connection control method according to an embodiment.

Refer to FIG. 9. FIG. 9 is a schematic flowchart of a grid connection control method according to the embodiments. The grid connection control method provided in the embodiments is applicable to any power supply system shown in FIG. 1 to FIG. 8. As shown in FIG. 9, the grid connection control method provided in the embodiments includes the following steps.

S701: A power station collection module obtains an amplitude value and a frequency of a grid connection voltage at a grid connection point, and obtains a power station power adjustment signal based on the amplitude value and the frequency of the grid connection voltage. S702: An inverter collection control circuit obtains an amplitude value and a frequency of an output voltage of an inverter, obtains an inverter power adjustment signal based on the amplitude value and the frequency of the output voltage, and controls, based on the power station power adjustment signal and the inverter power adjustment signal, the inverter to output a target output power.

In the implementations provided in the embodiments, the power station collection module may obtain the amplitude value and the frequency of the grid connection voltage at the grid connection point. Herein, the amplitude value and the frequency of the grid connection voltage are related to a power station power (that is, an output power of the power supply system at the grid connection point). The system may determine an adjustment amount of the power station power based on the amplitude value and the frequency of the grid connection voltage, to further obtain the power station power adjustment signal. The inverter collection control circuit may obtain the amplitude value and the frequency of the output voltage of the inverter. Herein, the amplitude value and the frequency of the output voltage of the inverter are related to an inverter power (that is, an output power of the inverter). The inverter collection control circuit may determine an adjustment amount of the inverter power based on the amplitude value and the frequency of the output voltage of the inverter, to further obtain the inverter power adjustment signal. Because another functional module or an electric energy element (for example, a transformer) exists between an output end of the inverter and the grid connection point, the inverter collection control circuit may obtain a target adjustment amount of the output power of the inverter jointly based on the power station power adjustment signal and the inverter power adjustment signal, and may control the inverter to output the target output power.

According to the implementations provided in the embodiments, the system may collect the amplitude value and the frequency of the grid connection voltage at the grid connection point and the amplitude value and the frequency of the output voltage of the inverter by using the power station collection module and the inverter collection control circuit, and separately determine the power station power adjustment signal and the inverter power adjustment signal, to further adjust the output power of the inverter based on the power station power adjustment signal and the inverter power adjustment signal. A structure is simple, and a control method is simple. This improves control precision and adjustment efficiency, reduces control time, and reduces control costs.

Figure 10:
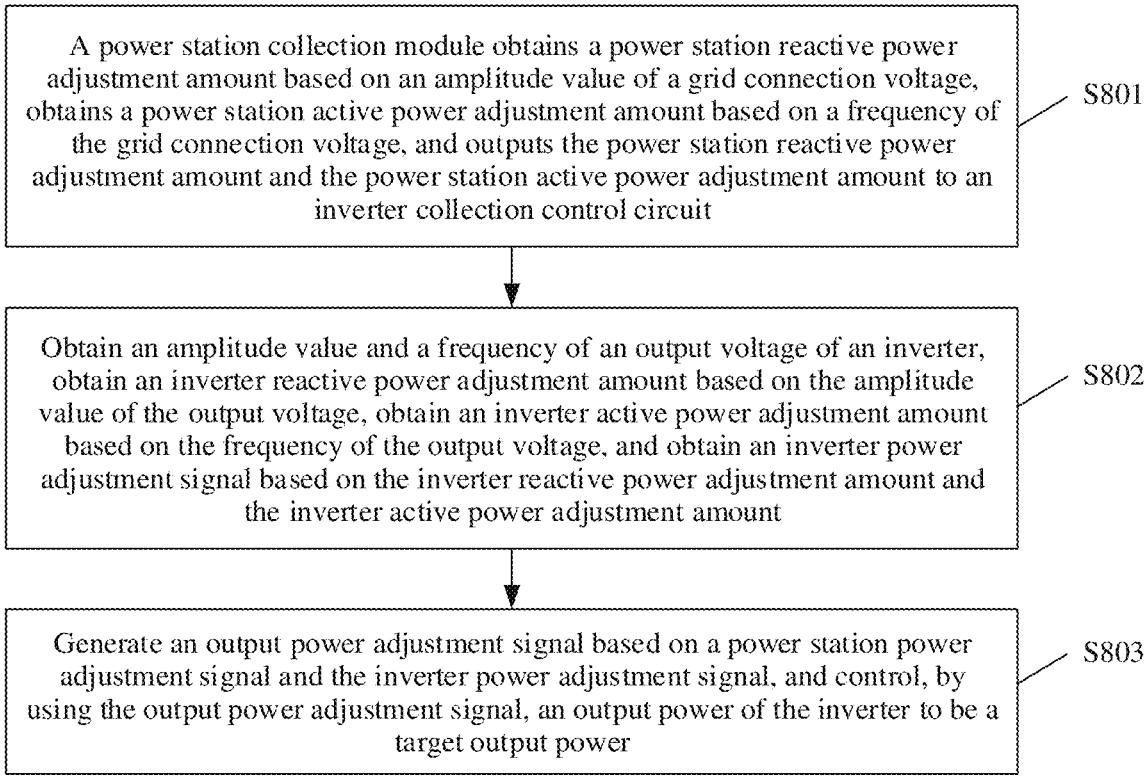
FIG. 10 is another schematic flowchart of a grid connection control method according to an embodiment.

In some implementations, the power station power adjustment signal may include a power station reactive power adjustment amount and a power station active power adjustment amount. Refer to FIG. 10. FIG. 10 is another schematic flowchart of a grid connection control method according to the embodiments. As shown in FIG. 10, the obtaining a power station power adjustment signal based on the amplitude value and the frequency of the grid connection voltage in the foregoing step S701 may include the following steps.

S801: The power station collection module obtains the power station reactive power adjustment amount based on the amplitude value of the grid connection voltage, obtains the power station active power adjustment amount based on the frequency of the grid connection voltage, and outputs the power station reactive power adjustment amount and the power station active power adjustment amount to the inverter collection control circuit.

It may be understood that, after the power station collection module obtains the amplitude value and the frequency of the grid connection voltage, because the amplitude value of the grid connection voltage is nonlinearly related to a reactive power adjustment amount in the power station power (that is, the output power of the power supply system at the grid connection point), and the frequency of the grid connection voltage is nonlinearly related to an active power adjustment amount in the power station power (that is, the output power of the power supply system at the grid connection point), the power station collection module may determine the reactive power adjustment amount and the active power adjustment amount of the power station power respectively based on the amplitude value and the frequency of the grid connection voltage at the grid connection point, to further output the power station reactive power adjustment amount and the power station active power adjustment amount to the inverter collection control circuit. According to the implementations provided in the embodiments, the power station collection module may determine the reactive power adjustment amount and the active power adjustment amount of the power station power respectively based on the amplitude value and the frequency of the grid connection voltage of the grid connection point, to further output the reactive power adjustment amount and the active power adjustment amount of the power station power as the power station power adjustment signal to a power adjustment module in the inverter collection control circuit. Therefore, the power adjustment module may obtain a target reactive power adjustment amount of the output power of the inverter based on the power station reactive power adjustment amount and the inverter reactive power adjustment amount, and may also obtain a target active power adjustment amount of the output power of the inverter based on the power station active power adjustment amount and the inverter active power adjustment amount, and may control the inverter to output the target output power (herein, the target output power may include a target reactive power and a target active power). A structure is simple. In addition, the system may control the inverter to separately output the target reactive power and/or the target active power. This improves control precision and adjustment efficiency, reduces control time, and reduces control costs.

In some implementations, that an inverter collection control circuit obtains an amplitude value and a frequency of an output voltage of an inverter, obtains an inverter power adjustment signal based on the amplitude value and the frequency of the output voltage, and controls, based on the power station power adjustment signal and the inverter power adjustment signal, the inverter to output a target output power in the foregoing step S702 may include the following steps.

S802: Obtain the amplitude value and the frequency of the output voltage of the inverter, obtain the inverter reactive power adjustment amount based on the amplitude value of the output voltage, obtain the inverter active power adjustment amount based on the frequency of the output voltage, and obtain the inverter power adjustment signal based on the inverter reactive power adjustment amount and the inverter active power adjustment amount.

S803: Generate an output power adjustment signal based on the power station power adjustment signal and the inverter power adjustment signal, and control, by using the output power adjustment signal, the output power of the inverter to be the target output power.

It may be understood that, after the obtaining the amplitude value and the frequency of the output voltage of the inverter, because the amplitude value of the output voltage of the inverter is nonlinearly related to a reactive power adjustment amount of the inverter power (that is, the output power of the inverter), and the frequency of the output voltage of the inverter is nonlinearly related to an active power adjustment amount of the inverter power (that is, the output power of the inverter), the inverter collection control circuit may determine the reactive power adjustment amount and the active power adjustment amount of the inverter power respectively based on the amplitude value and the frequency of the output voltage of the inverter, to further obtain the inverter power adjustment signal. It may be further understood that, the inverter collection control circuit may obtain the target adjustment amount of the output power of the inverter jointly based on the power station power adjustment signal output by the power station collection module and the inverter power adjustment signal output by the inverter collection control circuit, and may control the inverter to output the target output power.

According to the implementations provided in the embodiments, the inverter collection control circuit may determine the reactive power adjustment amount and the active power adjustment amount of the inverter power respectively based on the amplitude value and the frequency of the output voltage of the inverter, to obtain the inverter power adjustment signal, to further obtain the target adjustment amount of the output power of the inverter jointly based on the power station power adjustment signal output by the power station collection module and the inverter power adjustment signal output by the inverter collection control circuit, and may control the inverter to output the target output power. A structure is simple. In addition, the inverter collection control circuit may separately control a reactive power and an active power of the inverter. This improves control precision and adjustment efficiency, reduces control time, and reduces control costs.

In some implementations, the inverter reactive power adjustment amount and the inverter active power adjustment amount satisfy the following formulas:

$$d^2Q1(u)/du^2 < 0 \qquad (11)$$

$$d^2P1(f)/df^2 < 0 \qquad (12)$$

Herein, Q1(u) is a function of the inverter reactive power adjustment amount about the amplitude value of the output voltage, $d^2Q1(u)/du^2$ is a second derivative of the inverter reactive power adjustment amount about the amplitude value of the output voltage, P1(f) is a function of the inverter active power adjustment amount about the frequency of the output voltage, and $d^2P1(f)/df^2$ is a second derivative of the inverter active power adjustment amount about the frequency of the output voltage.

It may be understood that, in an application scenario, a larger difference between the amplitude value of the output voltage and an amplitude value of a target output voltage indicates a larger corresponding inverter reactive power adjustment amount. The inverter reactive power adjustment amount is not simply linearly related to the amplitude value of the output voltage. When a difference between the amplitude value of the output voltage and the amplitude value of the target output voltage increases, a growth rate of the corresponding inverter reactive power adjustment amount is greater than a growth rate of the difference between the amplitude value of the output voltage and the amplitude value of the target output voltage. Therefore, Q1(u) (for example, a quadratic power function) is used as a fitting function of the inverter reactive power adjustment amount about the amplitude value of the output voltage, so that the inverter reactive power adjustment amount may be prevented from being excessively small in linear fitting when the difference between the amplitude value of the output voltage and the amplitude value of the target output voltage is large due to an excessively small linear fitting coefficient, and the inverter reactive power adjustment amount may also be prevented from being excessively large in linear fitting when the difference between the amplitude value of the output voltage and the amplitude value of the target output voltage is small due to an excessively large linear fitting coefficient.

It may be further understood that, in an application scenario, a larger difference between the frequency of the output voltage and a frequency of the target output voltage indicates a larger corresponding inverter active power adjustment amount. The inverter active power adjustment amount is not simply linearly related to the frequency of the output voltage. When a difference between the frequency of the output voltage and the frequency of the target output voltage increases, a growth rate of the corresponding inverter active power adjustment amount is greater than a growth rate of the difference between the frequency of the output voltage and the frequency of the target output voltage. Therefore, P1(f) (for example, a quadratic power function) is used as the function of the inverter active power adjustment amount about the frequency of the output voltage, so that the inverter active power adjustment amount may be prevented from being excessively small in linear fitting when the difference between the frequency of the output voltage and the frequency of the target output voltage is large due to an excessively small linear fitting coefficient, and the inverter active power adjustment amount may also be prevented from being excessively large in linear fitting when the difference between the frequency of the output voltage and the frequency of the target output voltage is small due to an excessively large linear fitting coefficient.

According to the implementations provided in the embodiments, Q1(u) (for example, a quadratic power function) is used as the function of the inverter reactive power adjustment amount about the amplitude value of the output voltage, so that the inverter reactive power adjustment amount may be obtained more accurately based on the amplitude value of the output voltage. A method is simple, and control precision and control efficiency are improved. P1(f) (for example, a quadratic power function) is used as the function of the inverter active power adjustment amount about the frequency of the output voltage, so that the inverter active power adjustment amount may be obtained more accurately based on the frequency of the output voltage. A method is simple, and control precision and control efficiency are improved.

In some implementations, the power station reactive power adjustment amount and the inverter active power adjustment amount satisfy the following formulas:

$$d^2 Q2(u)/du^2 < 0 \quad (13)$$

$$d^2 P2(f)/df^2 < 0 \quad (14)$$

Herein, Q2(u) is a function of the power station reactive power adjustment amount about the amplitude value of the grid connection voltage, $d^2Q2(u)/du^2$ is a second derivative of the power station reactive power adjustment amount about the amplitude value of the grid connection voltage, P2(f) is a function of the power station active power adjustment amount about the frequency of the grid connection voltage, and $d^2P2(f)/df^2$ is a second derivative of the power station active power adjustment amount about the frequency of the grid connection voltage.

It may be understood that, in an application scenario, a larger difference between the amplitude value of the grid connection voltage and an amplitude value of a target grid connection voltage indicates a larger corresponding power station reactive power adjustment amount. The power station reactive power adjustment amount is not simply linearly related to the amplitude value of the grid connection voltage. When the difference between the amplitude value of the grid connection voltage and the amplitude value of the target grid connection voltage increases, a growth rate of the corresponding power station reactive power adjustment amount is greater than a growth rate of the difference between the amplitude value of the grid connection voltage and the amplitude value of the target grid connection voltage. Therefore, Q2(u) (for example, a quadratic power function) is used as a fitting function of the power station reactive power adjustment amount about the amplitude value of the grid connection voltage, so that the power station reactive power adjustment amount may be prevented from being excessively small in linear fitting when the difference between the amplitude value of the grid connection voltage and the amplitude value of the target grid connection voltage is large due to an excessively small linear fitting coefficient, and the power station reactive power adjustment amount may also be prevented from being excessively large in linear fitting when the difference between the amplitude value of the grid connection voltage and the amplitude value of the target grid connection voltage is small due to an excessively large linear fitting coefficient.

It may be further understood that, in an application scenario, a larger difference between the frequency of the grid connection voltage and a frequency of the target grid connection voltage indicates a larger corresponding power station active power adjustment amount. The power station active power adjustment amount is not simply linearly related to the frequency of the grid connection voltage. When a difference between the frequency of the grid connection voltage and the frequency of the target grid connection voltage increases, a growth rate of the corresponding power station active power adjustment amount is greater than a growth rate of the difference between the frequency of the grid connection voltage and the frequency of the target grid connection voltage. Therefore, P2(f) (for example, a quadratic power function) is used as the function of the power station active power adjustment amount about the frequency of the grid connection voltage, so that the power station active power adjustment amount may be prevented from being excessively small in linear fitting when the difference between the frequency of the grid connection voltage and the frequency of the target grid connection voltage is large due to an excessively small linear fitting coefficient, and the power station active power adjustment amount may also be prevented from being excessively large in linear fitting when the difference between the frequency of the grid connection voltage and the frequency of the target grid connection voltage is small due to an excessively large linear fitting coefficient.

According to the implementations provided in the embodiments, Q2(u) (for example, a quadratic power function) is used as the function of the power station reactive power adjustment amount about the amplitude value of the grid connection voltage, so that the power station reactive power adjustment amount may be obtained more accurately based on the amplitude value of the grid connection voltage. A method is simple, and control precision and control efficiency are improved. P2(f) (for example, a quadratic power function) is used as the function of the power station active power adjustment amount about the frequency of the grid connection voltage, so that the power station active power adjustment amount may be obtained more accurately based on the frequency of the grid connection voltage. A method is simple, and control precision and control efficiency are improved.

In some implementations, an output reactive power adjustment amount and an output active power adjustment amount satisfy the following formulas:

$$Qout = Q1 + k1(Q2 - Q1) \qquad (15)$$

$$Pout = P1 + k2(P2 - P1) \qquad (16)$$

Herein, Qout is the output reactive power adjustment amount, Q1 is the inverter reactive power adjustment amount, Q2 is the power station reactive power adjustment amount, k1 is an output reactive power adjustment coefficient, Pout is the output active power adjustment amount, P1 is the inverter active power adjustment amount, P2 is the power station active power adjustment amount, and k2 is an output active power adjustment coefficient.

According to the implementations provided in the embodiments, the system may obtain the output reactive power adjustment amount Qout (that is, the target reactive power adjustment amount of the output power of the inverter) based on the power station reactive power adjustment amount Q1 and the inverter reactive power adjustment amount Q1, and may also obtain the output active power adjustment amount Pout (that is, the target active power adjustment amount of the output power of the inverter) based on the power station active power adjustment amount P1 and the inverter active power adjustment amount P1, and generate the output power adjustment signal (for example, a pulse width modulation signal or another control signal that may control the output power of the inverter) based on the output reactive power adjustment amount Qout and the output active power adjustment amount Pout. This improves control precision and adjustment efficiency, reduces control time, and reduces control costs.

In some implementations, the power station power adjustment signal may include the amplitude value and the frequency of the grid connection voltage. The obtaining a power station power adjustment signal based on the amplitude value and the frequency of the grid connection voltage in the foregoing step S701 may include: The power station collection module obtains the amplitude value and the frequency of the grid connection voltage at the grid connection point, and outputs the amplitude value and the frequency of the grid connection voltage at the grid connection point to the inverter collection control circuit.

According to the implementations provided in the embodiments, in a scenario in which a communication speed (or a frequency) between the power station collection module and the inverter collection control circuit is limited, or in another scenario in which real-time communication between the power station collection module and the inverter collection control circuit is inconvenient, the system may output the amplitude value and the frequency of the grid connection voltage at the grid connection point to the inverter collection control circuit by using the inverter collection control circuit, and the inverter collection control circuit determines the adjustment amount of the power station based on the amplitude value and the frequency of the grid connection voltage. A method is simple and flexible, has high applicability, and enriches application scenarios and an application scope of the system.

In some implementations, in the foregoing step S701, after the outputting the amplitude value and the frequency of the grid connection voltage at the grid connection point to the inverter collection control circuit, the method may include:

obtaining a power station reactive power adjustment amount based on the amplitude value of the grid connection voltage, obtaining a power station active power adjustment amount based on the frequency of the grid connection voltage, and outputting the power station reactive power adjustment amount and the power station active power adjustment amount. Herein, in the scenario in which the communication speed (or the frequency) between the power station collection module and the inverter collection control circuit is limited, or in another scenario in which the real-time communication between the power station collection module and the inverter collection control circuit is inconvenient, or in another scenario in which the power station collection module directly transmits the amplitude value and the frequency of the grid connection voltage to the inverter collection control circuit, the inverter collection control circuit may determine a reactive power adjustment amount and an active power adjustment amount of the power station power respectively based on the amplitude value and the frequency of the grid connection voltage of the grid connection point, to further output the reactive power adjustment amount and the active power adjustment amount of the power station power as the power station power adjustment signal. Therefore, the inverter collection control circuit may obtain a target reactive power adjustment amount of the output power of the inverter jointly based on the power station reactive power adjustment amount and the inverter reactive power adjustment amount, and may also obtain a target active power adjustment amount of the output power of the inverter jointly based on the power station active power adjustment amount and the inverter active power adjustment amount, and may control the inverter to output the target output power (herein, the target output power may include a target reactive power and a target active power). A structure is simple. In addition, the inverter collection control circuit may control the inverter to separately output the target reactive power and/or the target active power. This improves control precision and adjustment efficiency, reduces control time, and reduces control costs.

According to the implementations provided in the embodiments, in the scenario in which the communication speed (or the frequency) between the power station collection module and the inverter collection control circuit is limited, or in another scenario in which the real-time communication between the power station collection module and the inverter collection control circuit is inconvenient, or in another scenario in which the power station collection module directly transmits the amplitude value and the frequency of the grid connection voltage to the inverter collection control circuit, the inverter collection control circuit may determine the reactive power adjustment amount and the active power adjustment amount of the power station power respectively based on the amplitude value and the frequency of the grid connection voltage of the grid connection point, to further output the reactive power adjustment amount and the active power adjustment amount of the power station power as the power station power adjustment signal. A method is simple and flexible, has high applicability, and enriches the application scenarios and the application scope of the system. The inverter collection control circuit may obtain the target reactive power adjustment amount of the output power of the inverter jointly based on the power station reactive power adjustment amount and the inverter reactive power adjustment amount, and may also obtain the target active power adjustment amount of the output power of the inverter jointly based on the power station active power adjustment amount and the inverter active power adjustment amount, and may control the inverter to output the target output power (herein, the target output power may include the target reactive power and the target active power). A structure is simple. In addition, the inverter collection control circuit may control the inverter to separately output the target reactive power and/or the target active power. This improves control precision and adjustment efficiency, reduces control time, and reduces control costs.

In some implementations, that the power adjustment module generates an output power adjustment signal based on the power station power adjustment signal and the inverter power adjustment signal, and controls, by using the output power adjustment signal, the output power of the inverter to be the target output power in the foregoing step S702 may include: obtaining the output reactive power adjustment amount based on the power station reactive power adjustment amount and the inverter reactive power adjustment amount, obtaining the output active power adjustment amount based on the power station active power adjustment amount and the inverter active power adjustment amount, and generating the output power adjustment signal based on the output reactive power adjustment amount and the output active power adjustment amount. The inverter is controlled, by using the output power adjustment signal, to output the target output power.

Herein, the inverter collection control circuit may obtain the output reactive power adjustment amount (that is, the target reactive power adjustment amount of the output power of the inverter) based on the power station reactive power adjustment amount and the inverter reactive power adjustment amount, and may also obtain the output active power adjustment amount (that is, the target active power adjustment amount of the output power of the inverter) based on the power station active power adjustment amount and the inverter active power adjustment amount, and generate the output power adjustment signal (for example, a pulse width modulation signal or another control signal that may control the output power of the inverter) based on the output reactive power adjustment amount and the output active power adjustment amount. Herein, the inverter collection control circuit may control, by using the output power adjustment signal, the inverter to output the target output power (herein, the target output power may include the target reactive power and the target active power). This improves control precision and adjustment efficiency, reduces control time, and reduces control costs.

In the embodiments, the system may collect the amplitude value and the frequency of the grid connection voltage at the grid connection point and the amplitude value and the frequency of the output voltage of the inverter by using the power station collection module and the inverter collection control circuit, and separately determine the power station power adjustment signal and the inverter power adjustment signal, to further adjust the output power of the inverter based on the power station power adjustment signal and the inverter power adjustment signal. A structure is simple, and a control method is simple. This improves control precision and adjustment efficiency, reduces control time, and reduces control costs.

The foregoing descriptions are merely implementations of the embodiments, but are not intended as limiting. Any variation or replacement readily figured out by a person skilled in the art within the shall fall within the scope of the embodiments.

What is claimed is:

1. A power supply system, comprising:
a power supply,
an inverter,
a transformer,
a power station collection module, and
an inverter collection control circuit;
the power supply is connected to the transformer through the inverter, the transformer is connected to a power grid at a grid connection point, one end of the power station collection module is connected to the grid connection point, the other end of the power station collection module is connected to a first end of the inverter collection control circuit, a second end of the inverter collection control circuit is connected between the inverter and the transformer, and a third end of the inverter collection control circuit is connected to the inverter;
the power station collection module is configured to obtain an amplitude value and a frequency of a grid connection voltage at the grid connection point, and obtain a power station power adjustment signal based on the amplitude value and the frequency of the grid connection voltage; and
the inverter collection control circuit is configured to obtain an amplitude value and a frequency of an output voltage of the inverter, obtain an inverter power adjustment signal based on the amplitude value and the frequency of the output voltage, and control, based on the power station power adjustment signal and the inverter power adjustment signal, the inverter to output a target output power.

2. The power supply system according to claim 1, wherein the inverter collection control circuit comprises an inverter collection module and a power adjustment module, a first end of the power adjustment module is used as the first end of the inverter collection control circuit and is connected to the power station collection module, one end of the inverter collection module is used as the second end of the inverter collection control circuit and is connected between the inverter and the transformer, the other end of the inverter collection module is connected to a second end of the power adjustment module, and a third end of the power adjustment module is used as the third end of the inverter collection control circuit and is connected to the inverter;
the inverter collection module is configured to obtain the amplitude value and the frequency of the output voltage of the inverter, obtain an inverter reactive power adjustment amount based on the amplitude value of the output voltage, obtain an inverter active power adjustment amount based on the frequency of the output voltage, and obtain the inverter power adjustment signal based on the inverter reactive power adjustment amount and the inverter active power adjustment amount; and
the power adjustment module is configured to generate an output power adjustment signal based on the power station power adjustment signal and the inverter power adjustment signal, and control, by using the output power adjustment signal, the inverter to output the target output power.

3. The power supply system according to claim 2, wherein the power station power adjustment signal comprises a power station reactive power adjustment amount and a power station active power adjustment amount; and the power station collection module is further configured to obtain the power station reactive power adjustment amount based on the amplitude value of the grid connection voltage, obtain the power station active power adjustment amount based on the frequency of the grid connection voltage, and output the power station reactive power adjustment amount and the power station active power adjustment amount to the inverter collection control circuit.

4. The power supply system according to claim 3, wherein the power adjustment module further comprises an adjustment amount determining unit and a power control unit, the power control unit is connected to the inverter and one end of the adjustment amount determining unit, and the other end of the adjustment amount determining unit is connected to the inverter collection module the adjustment amount determining unit is configured to obtain an output reactive power adjustment amount based on the power station reactive power adjustment amount and the inverter reactive power adjustment amount, obtain an output active power adjustment amount based on the power station active power adjustment amount and the inverter active power adjustment amount, and generate the output power adjustment signal based on the output reactive power adjustment amount and the output active power adjustment amount; and the power control unit is configured to control, by using the output power adjustment signal, the inverter to output the target output power.

5. The power supply system according to claim 4, wherein the inverter reactive power adjustment amount and the inverter active power adjustment amount satisfy:

$$d^2Q1(u)/du^2 < 0$$
$$d^2P1(f)/df^2 < 0,$$

wherein Q1(u) is a function of the inverter reactive power adjustment amount about the amplitude value of the output voltage, $d^2Q1(u)/du^2$ is a second derivative of the inverter reactive power adjustment amount about the amplitude value of the output voltage, P1(f) is a function of the inverter active power adjustment amount about the frequency of the output voltage, and $d^2P1(f)/df^2$ is a second derivative of the inverter active power adjustment amount about the frequency of the output voltage.

6. The power supply system according to claim 5, wherein the power station reactive power adjustment amount and the inverter active power adjustment amount satisfy:

$$d^2Q2(u)/du^2 < 0$$
$$d^2P2(f)/df^2 < 0,$$

wherein Q2(u) is a function of the power station reactive power adjustment amount about the amplitude value of the grid connection voltage, $d^2Q2(u)/du^2$ is a second derivative of the power station reactive power adjustment amount about the amplitude value of the grid connection voltage, P2(f) is a function of the power station active power adjustment amount about the frequency of the grid connection voltage, and $d^2P2(f)/df^2$ is a second derivative of the power station active power adjustment amount about the frequency of the grid connection voltage.

7. The power supply system according to claim 6, wherein the output reactive power adjustment amount and the output active power adjustment amount satisfy:

$$Qout = Q1 + k1(Q2 - Q1)$$
$$Pout = P1 + k2(P2 - P1),$$

wherein

Qout is the output reactive power adjustment amount, Q1 is the inverter reactive power adjustment amount, Q2 is the power station reactive power adjustment amount, k1 is an output reactive power adjustment coefficient, Pout is the output active power adjustment amount, P1 is the inverter active power adjustment amount, P2 is the power station active power adjustment amount, and k2 is an output active power adjustment coefficient.

8. The power supply system according to claim 7, further comprising:

a combiner box, the power supply is connected to the inverter through the combiner box, the power supply system further comprises a direct current bus, the power supply is connected to the direct current bus through the combiner box, the direct current bus is connected to the inverter, the power supply system further comprises an on-grid and off-grid wiring apparatus, and the transformer is connected to the power grid through the on-grid and off-grid wiring apparatus.

9. The power supply system according to claim 3, wherein the power adjustment module further comprises an adjustment amount determining unit and a power control unit, the power control unit is connected to the inverter and one end of the adjustment amount determining unit, and the other end of the adjustment amount determining unit is connected to the signal determining module;

the adjustment amount determining unit is configured to obtain an output reactive power adjustment amount based on the power station reactive power adjustment amount and the inverter reactive power adjustment amount, obtain an output active power adjustment amount based on the power station active power adjustment amount and the inverter active power adjustment amount, and generate the output power adjustment signal based on the output reactive power adjustment amount and the output active power adjustment amount; and the power control unit is configured to control, by using the output power adjustment signal, the inverter to output the target output power.

10. The power supply system according to claim 9, wherein the inverter reactive power adjustment amount and the inverter active power adjustment amount satisfy:

$$d^2Q1(u)/du^2 < 0$$
$$d^2P1(f)/df^2 < 0,$$

wherein

Q1(u) is a function of the inverter reactive power adjustment amount about the amplitude value of the output voltage, $d^2Q1(u)/du^2$ is a second derivative of the inverter reactive power adjustment amount about the amplitude value of the output voltage, P1(f) is a function of the inverter active power adjustment amount about the frequency of the output voltage, and $d^2P1(f)/df^2$ is a second derivative of the inverter active power adjustment amount about the frequency of the output voltage.

11. The power supply system according to claim 10, wherein the power station reactive power adjustment amount and the inverter active power adjustment amount satisfy:

$$d^2Q2(u)/du^2 < 0$$
$$d^2P2(f)/df^2 < 0,$$

wherein

Q2(u) is a function of the power station reactive power adjustment amount about the amplitude value of the grid connection voltage, $d^2Q2(u)/du^2$ is a second derivative of the power station reactive power adjustment amount about the amplitude value of the grid connection voltage, P2(f) is a function of the power station active power adjustment amount about the frequency of the grid connection voltage, and $d^2P2(f)/df^2$ is a second derivative of the power station active power adjustment amount about the frequency of the grid connection voltage.

12. The power supply system according to claim 11, wherein the output reactive power adjustment amount and the output active power adjustment amount satisfy:

$$Qout = Q1 + k1(Q2 - Q1)$$
$$Pout = P1 + k2(P2 - P1),$$

wherein

Qout is the output reactive power adjustment amount, Q1 is the inverter reactive power adjustment amount, Q2 is the power station reactive power adjustment amount, k1 is an output reactive power adjustment coefficient, Pout is the output active power adjustment amount, P1 is the inverter active power adjustment amount, P2 is the power station active power adjustment amount, and k2 is an output active power adjustment coefficient.

13. The power supply system according to claim 12, wherein the power supply system further comprises a combiner box, the power supply is connected to the inverter through the combiner box, the power supply system further comprises a direct current bus, the power supply is connected to the direct current bus through the combiner box, the direct current bus is connected to the inverter, the power supply system further comprises an on-grid and off-grid wiring apparatus, and the transformer is connected to the power grid through the on-grid and off-grid wiring apparatus.

14. The power supply system according to claim 2, wherein the power station power adjustment signal comprises the amplitude value and the frequency of the grid connection voltage; and the power station collection module is further configured to obtain the amplitude value and the frequency of the grid connection voltage at the grid connection point, and output the amplitude value and the frequency of the grid connection voltage at the grid connection point to the inverter collection control circuit.

15. The power supply system according to claim 14, wherein the inverter collection control circuit further comprises a signal determining module, and the first end of the power adjustment module is connected to the power station collection module through the signal determining module; and the signal determining module is configured to obtain a power station reactive power adjustment amount based on the amplitude value of the grid connection voltage, obtain a power station active power adjustment amount based on the frequency of the grid connection voltage, and output the power station reactive power adjustment amount and the power station active power adjustment amount to the power adjustment module.

16. A grid connection control method, wherein the grid connection control method is applicable to a power station collection module that is connected to a grid connection point and that is in a power supply system, and the method is further applicable to an inverter collection control circuit of the power supply system, the method comprising:

obtaining, by the power station collection module, an amplitude value and a frequency of a grid connection voltage at the grid connection point, and obtaining a power station power adjustment signal based on the amplitude value and the frequency of the grid connection voltage; and obtaining, by the inverter collection control circuit, an amplitude value and a frequency of an output voltage of an inverter, obtaining an inverter power adjustment signal based on the amplitude value and the frequency of the output voltage, and controlling, based on the power station power adjustment signal and the inverter power adjustment signal, the inverter to output a target output power.

17. The grid connection control method according to claim 16, wherein obtaining, by the inverter collection control circuit, the amplitude value and the frequency of the output voltage of the inverter, obtaining the inverter power adjustment signal based on the amplitude value and the frequency of the output voltage, and controlling, based on the power station power adjustment signal and the inverter power adjustment signal, the inverter to output the target output power comprises:

obtaining the amplitude value and the frequency of the output voltage of the inverter, obtaining an inverter reactive power adjustment amount based on the amplitude value of the output voltage, obtaining an inverter active power adjustment amount based on the frequency of the output voltage, and obtaining the inverter power adjustment signal based on the inverter reactive power adjustment amount and the inverter active power adjustment amount; and generating an output power adjustment signal based on the power station power adjustment signal and the inverter power adjustment signal, and controlling, by using the output power adjustment signal, the output power of the inverter to be the target output power.

18. The grid connection control method according to claim 17, wherein the power station power adjustment signal comprises a power station reactive power adjustment amount and a power station active power adjustment amount, and obtaining the power station power adjustment signal based on the amplitude value and the frequency of the grid connection voltage comprises:

obtaining, by the power station collection module, the power station reactive power adjustment amount based on the amplitude value of the grid connection voltage, obtaining the power station active power adjustment amount based on the frequency of the grid connection voltage, and outputting the power station reactive power adjustment amount and the power station active power adjustment amount to the inverter collection control circuit.

19. The grid connection control method according to claim 17, wherein the power station power adjustment signal comprises the amplitude value and the frequency of the grid connection voltage, and the obtaining the power station power adjustment signal based on the amplitude value and the frequency of the grid connection voltage comprises:

obtaining, by the power station collection module, the amplitude value and the frequency of the grid connection voltage at the grid connection point, and outputting the amplitude value and the frequency of the grid connection voltage at the grid connection point to the inverter collection control circuit.

20. The grid connection control method according to claim 19, wherein after outputting the amplitude value and the frequency of the grid connection voltage at the grid connection point to the inverter collection control circuit, the method further comprises:

obtaining a power station reactive power adjustment amount based on the amplitude value of the grid connection voltage, obtaining a power station active power adjustment amount based on the frequency of the grid connection voltage, and outputting the power station reactive power adjustment amount and the power station active power adjustment amount.

* * * * *